United States Patent
Sato et al.

[11] Patent Number: 5,384,166
[45] Date of Patent: Jan. 24, 1995

[54] METHOD FOR CONTROLLING COATING WEIGHT ON A HOT-DIPPED STEEL STRIP

[75] Inventors: Toshio Sato; Toshio Ishii; Shunichi Sugiyama; Akira Yada, all of Kawasaki, Japan

[73] Assignee: NKK Corporation, Tokyo, Japan

[21] Appl. No.: 150,759

[22] Filed: Nov. 10, 1993

Related U.S. Application Data

[63] Continuation of Ser. No. 899,723, Jun. 17, 1992, abandoned.

[30] Foreign Application Priority Data

| Jun. 25, 1991 | [JP] | Japan | 3-180417 |
| Jun. 25, 1991 | [JP] | Japan | 3-180418 |
| Jun. 25, 1991 | [JP] | Japan | 3-180419 |
| Jun. 25, 1991 | [JP] | Japan | 3-180420 |
| Aug. 26, 1991 | [JP] | Japan | 3-238762 |

[51] Int. Cl.⁶ ............................................. B05D 1/04
[52] U.S. Cl. ................................... 427/547; 427/598; 427/10; 427/331; 427/349; 427/433
[58] Field of Search ............... 427/547, 598, 437, 349, 427/331, 10

[56] References Cited

U.S. PATENT DOCUMENTS

| 3,928,657 | 12/1975 | Armstrong et al. | 427/547 |
| 4,273,800 | 6/1981 | Reid | 427/127 |
| 4,518,840 | 5/1985 | Bronner | 219/10.67 |

FOREIGN PATENT DOCUMENTS

| 0087345 | 8/1983 | France . |
| 44-7444 | 4/1969 | Japan . |
| 61-204363 | 9/1986 | Japan . |
| 61-227158 | 10/1986 | Japan . |
| 61-266560 | 11/1986 | Japan . |
| 62-103353 | 5/1987 | Japan . |

OTHER PUBLICATIONS

Patent Abstracts of Japan, vol. 7, No. 66 (C-157) Mar. 18, 1983 & JP-A-58 001 064 (Sumitomo Kinzoku Kogyo KK).
Patent Abstracts of Japan, vol. 7, No. 69 (C-158) Mar. 23, 1983 & JP-A-58 003 958 (Sumitomo Kinzoku Kogyo KK).

*Primary Examiner*—Shrive Beck
*Assistant Examiner*—David M. Maiorana
*Attorney, Agent, or Firm*—Frishauf, Holtz, Goodman & Woodward

[57] ABSTRACT

A method for controlling coating weight on a hot-dipped steel strip comprises the steps of positioning at least one pair of high-frequency (alternating) current conducting paths near one side of a steel strip and near another side of the steel strip drawn out of a coating bath, each of the high-frequency (alternating) current conducting paths being parallel with a surface of the steel strip above the coating bath, and flowing a-high-frequency (alternating) current strong enough to magnetically saturate the steel strip through the at least one pair of high-frequency (alternating) current conducting paths to induce a high-frequency (alternating) current of an opposite phase in the steel strip, a magnetic pressure acting on surfaces of the steel strip being generated by an interaction of the induced high-frequency (alternating) current with a high-frequency (alternating) current of the high-frequency (alternating) current conducting paths.

6 Claims, 24 Drawing Sheets

METHOD FOR CONTROLLING COATING WEIGHT ON A HOT-DIPPED STEEL STRIP

This application is a continuation of application Ser. No. 07/899,723, filed Jun. 17, 1992, now abandoned.

BACKGROUND OF THE INVENTION

1. Field of the Invention

The present invention relates to a method for continuously plating a steel strip with molten metal, and more particularly to a method for controlling coating weight on a steel strip.

2. Description of the Related Arts

Sink rolls, pinch rolls and wiping nozzles are used in the prior art methods for continuously plating a steel strip with molten metal. The sink rolls are positioned in a coating bath.

A steel strip is moved by the sink rolls and drawn out above the coating bath. The pinch rolls are used for pressing the steel strip down and straightening a bowed steel strip. An excess plating on the steel strip drawn out above the coating bath is removed by jetting a gas from wiping nozzles, whereby a uniform thickness of plating can be obtained.

In the prior art methods, when a moving speed of a steel strip is increased to enhance the productivity of steel strip, coating weight on the steel strip is increased. It is necessary to increase a pressure of gas from the wiping nozzles to lower the coating weight on the steel strip. When the pressure of the gas from the wiping nozzles is enhanced, a gas jet strikes against the steel strip at a high speed and scrapes away an excess molten metal downward. The gas jet having struck against the steel strip generates a flow of associated gas. Parts of molten metal are converted to a splash by the flow of associated gas. The splash having attached to the wiping nozzles clogs the nozzles. As a result, gas cannot be jetted from the wiping nozzles uniformly on the steel strip and the coating weight on the steel strip cannot be uniform.

When the coating weight on the steel strip is not uniform, the appearance of the steel strip is not good. An unequal coating weight on the steel strip can also make an unequal coiling of the steel strip and causes an alloying of the plating generated after plating the steel strip to be unequal. Parts of the splash attach to the steel strip again, which becomes a cause of defects of the steel strip. The increase of the amount of gas from the wiping nozzles gives rise to the increase of cost and generates a noise.

Various methods for removing an excess molten metal on a steel strip in response to an increase of a plating speed have been reported.

Japanese Examined Patent Publication No. 7444/69 discloses a method wherein an eddy current is generated in a steel strip by applying a high-frequency magnetic field to the steel strip and a molten metal is removed by Lorentz force generated by the eddy current. In this case, a wiping of molten metal by means of gas is used together with the application of the high-frequency magnetic field to the steel strip.

According to a method disclosed in Japanese Examined Patent Publication No. 227158/86, a stationary electric current is flowed in a steel strip and Lorentz force generated by the stationary electric current with a static magnetic field removes an excess molten metal on the steel strip. After the excess molten metal has been removed from the steel strip, the steel strip is wiped by gas.

According to a method disclosed in Japanese Patent Application Laid Open No. 204363/86, a static magnetic field is generated on a surface of a steel strip in an outward direction from the surface of the steel strip, and an excess molten metal is removed by Lorentz force generated by an induced current generated in the molten metal by movement of the steel strip and a static magnetic field. Further, the steel strip is wiped by gas.

Japanese Patent Applications Laid Open No. 266560/86 and No. 103353/87 disclose a method wherein an excess molten metal is moved downwardly by a moving magnetic field generated in a downward direction from the steel strip and the steel strip is wiped by gas.

In those conventional methods, however, when the magnetic field is caused to act on a ferromagnetic body such as steel strip, the steel strip is drawn toward a stronger magnetic field. In consequence, a system as a whole becomes unstable, and it is difficult to appropriately control the system. To avoid this difficulty, it is necessary to space out a magnetic field generator and the steel strip. When the magnetic field generator and the steel strip are spaced out, the effect of the magnetic field is limited, which does not produce an effect as an object.

Vibration of a steel strip and bowing of a steel strip in a width direction thereof can be the causes that coating weight on the steel strip is not uniform. Any of the above-described conventional methods has no effect on damping of vibration and straightening of bowing of the steel strip. It is described in Japanese Examined Patent Publication No. 7444/69 that a steel strip passing between coils is centered between the coils by a magnetic repulsive force. However, since a magnetic attracting force strongly acts on the steel strip as a ferromagnetic body when a high-frequency magnetic field is simply applied to the steel strip, the steel strip passing between the coils is attracted toward the coils. As a result, an unstable vibration of the steel strip is generated. Therefore, any damping of vibration of the steel strip cannot be expected in accordance with this method.

SUMMARY OF THE INVENTION

It is an object of the present invention to provide a method for controlling coating weight on a steel strip so that metal can attach uniformly to the steel strip at a high speed while preventing the steel strip from bowing and damping the vibration of the steel strip during plating of the steel strip with metal.

To attain the above-described object, the present invention provides a method for controlling coating weight on a hot-dipping steel strip, comprising the steps of:

positioning at least one pair of high-frequency (alternating) current conducting paths near one side of a steel strip and near another side of the steel strip drawn out of a coating bath, each of the high-frequency current conducting paths being parallel with a surface of the steel strip above the coating bath;

flowing a high-frequency (alternating) current strong enough to magnetically saturate the steel strip through said at least one pair of high-frequency (alternating) current conducting paths to induce a high-frequency (alternating) current of an opposite phase in the steel strip, a magnetic pressure acting on surfaces of the steel strip being generated by interaction of the induced high-frequency (alternating) current with a high-frequency (alternating) current of the high-frequency (alternating) current conducting paths.

The above objects and other objects and advantages of the present invention will become apparent from the following detailed description, taken in conjunction with the appended drawings.

DESCRIPTION OF THE PREFERRED EMBODIMENT

Preferred Embodiment 1

Figure 1:
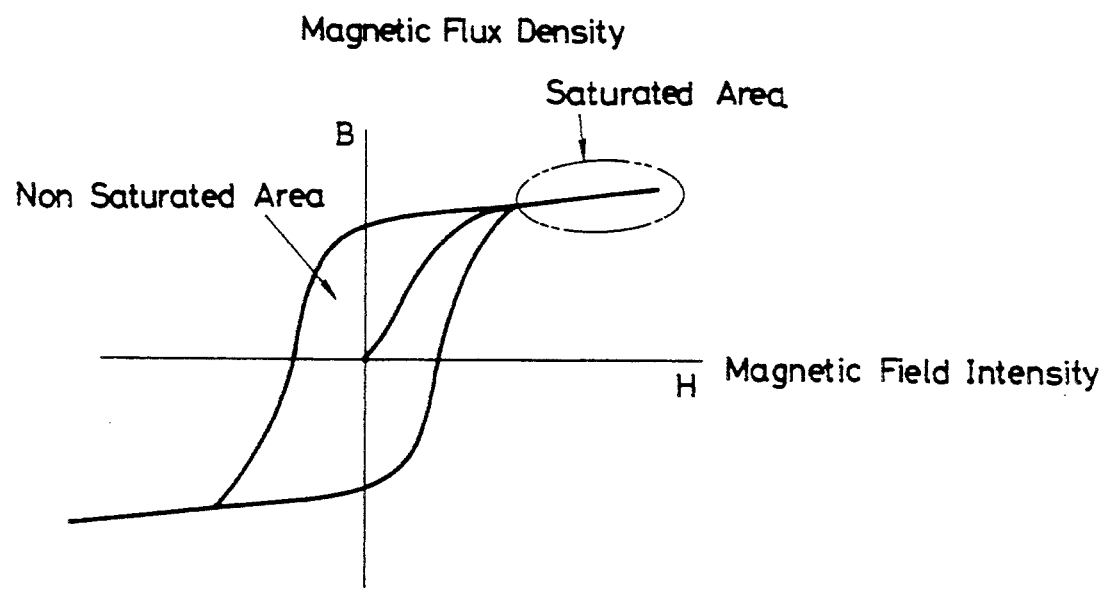
FIG. 1 is a graphical representation showing the relationship between the magnetic field intensity (H) and the magnetic flux density (B) of a steel strip.

Although a magnetic field is simply applied to a ferromagnetic body such as a steel strip to damp a vibration of the steel strip and to control coating weight on the steel strip, a magnetic attracting force acts on the steel strip, which produces an unstable state of the steel strip. The present inventors paid attention to the fact that, as shown by a B-H curve indicating the relationship between the magnetic field intensity (H) and the magnetic flux density (B) in FIG. 1, an area showing a ferromagnetism of the steel strip is confined to a non-saturation area, but the steel strip has no ferromagnetism in a saturation area. When a high-frequency current strong enough to reach the saturation area is applied to the steel strip, a magnetic repulsive force of the steel strip becomes stronger than a magnetic attracting force of the steel strip. The repulsive force is generated between an electric current flowing through a high-frequency current conducting path and an induced current in the steel strip. Thus, an unstable state produced by the magnetic attracting force is removed. The high-frequency current is desired to have 500 to 10,000 Hz. When the high-frequency current has a frequency of less-than 500 Hz, there is no effect. When the high-frequency current has a frequency of more than 10,000 Hz, a consumption of electricity becomes extremely great.

In the present invention, high-frequency current conducting paths each parallel with each side of a steel strip are arranged near the steel strip on one side of the steel strip and on another side of the steel strip drawn out of a coating bath above the surface of molten metal in the coating bath. A high-frequency current strong enough to magnetically saturate the steel strip is flowed through the high-frequency current conducting paths to induce a high-frequency current of opposite phase in the steel strip. A magnetic pressure acting on the surfaces of the steel strip through an interaction of this induced high-frequency current with the high-frequency current of the high-frequency current Conducting paths is generated. Molten metal attaching to the steel strip is wiped out by a magnetic pressure applied from both sides of the steel strip to the steel strip and a coating weight on the steel strip is controlled. Together with the control of the coating weight on the steel strip, bowing of the steel strip in a width direction and vibration of the steel strip is prevented.

In the present invention, pairs of two high-frequency current conducting paths or more can be arranged at regular intervals in the direction of movement of a steel strip. The high-frequency current conducting paths near one side of the steel strip and near another side of the steel strip are positioned, substantially facing each other, the steel strip being positioned between the high-frequency current conducting paths. A high-frequency current of the same phase is flowed through the facing high-frequency current conducting paths. In the case where a plurality of high-frequency current conducting paths are arranged near one side of the steel strip and near another side the steel strip respectively, the high-frequency current conducting paths can be positioned, facing each other or without facing each other, the steel strip being positioned between the high-frequency current conducting paths. When the high-frequency current conducting paths do not face each other, the high-frequency current conducting paths are shifted in the direction of movement of the steel strip.

When the high-frequency current conducting paths are shifted in the direction of movement of the steel strip, there is no limitation regarding the phases of current as in the case where the high-frequency current conducting paths are positioned, facing each other, the steel strip being positioned between the high-frequency current conducting paths.

Each of the high-frequency current conducting paths is arranged across the steel strip in a width direction thereof. It is unnecessary, however, to arrange the steel strip in parallel with a width direction of the steel strip. The entire length of each of the high-frequency current conducting paths can be inclined relative to a width direction of the steel strip. Since the electric current flows near the edges of the steel strip at an angle of 90° to the direction of flow of electric current through the high-frequency current conducting path, the magnetic pressure adjacent to the edges of the steel strip tends to weaken. To prevent the magnetic pressure from weakening near the edges of the steel strip, the entire length of each of the high-frequency current conducting paths can be inclined relative to the width direction of the steel strip or can be inclined near the edges of the steel strip.

Figure 2:
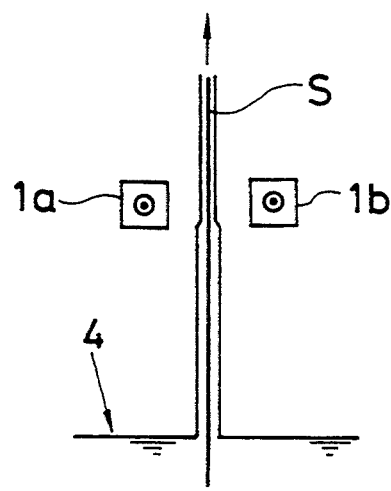
FIG. 2 is a side elevation showing an example of an apparatus for executing the method of the present invention.
Figure 3:
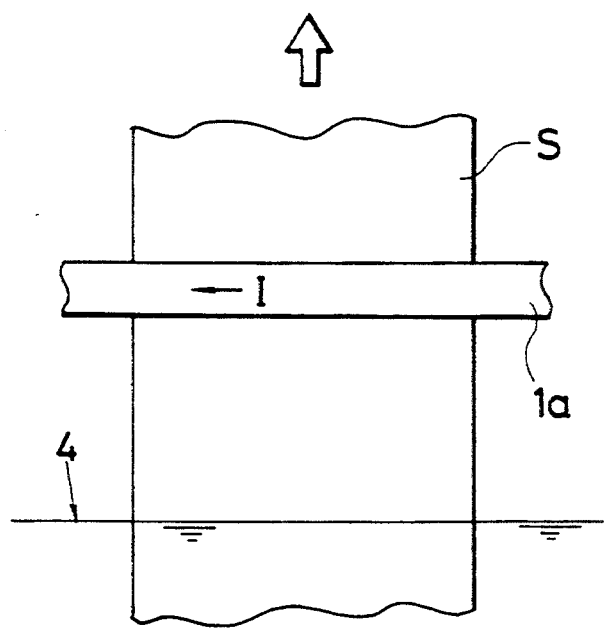
FIG. 3 is a front elevation showing the apparatus as shown in FIG. 2.

FIG. 2 is a side elevation showing an example of an apparatus for executing the method of the present invention. FIG. 3 is a front elevation showing the apparatus as shown in FIG. 2. Symbol I in the drawing denotes a current.

A steel strip S is continuously drawn from a coating bath 4. High-frequency current conducting paths $1a$, $1b$ are arranged in parallel with one side of a steel strip and another side of the steel strip S. When a high-frequency current I of the same phase is flowed through the high-frequency current conducting paths $1a$, $1b$, an electric current having a phase opposite to the phase of the high-frequency current I flows through the steel strip S. Symbol⊙ of the high-frequency current conducting path $aa$ and Symbol⊙ of the high-frequency current conducting path $1b$ denote that the current of both the high-frequency current conducting paths have the same phase. Since the current flowing through the Steel strip-flows in a direction opposite to the direction of the current flowing through the high-frequency current conducting paths, a magnetic repulsive force, that is, a magnetic pressure acts on the surfaces of the steel strip. However, since a ferromagnetic body such as a steel strip has a high permeability, a magnetic attracting force of the steel strip exceeds a magnetic repulsive force of the steel strip when an electric current is simply flowed through the high-frequency current conducting paths $1a$, $1b$, and the steel strip comes to be in an unstable state. When the electric current flowing through the high-frequency current conducting paths $1a$, $1b$ is increased, an amplitude of a magnetic field in the steel strip as shown in FIG. 1 is increased and a retention time, during which the steel strip is retained in a saturation area, becomes longer. As a result, when the amplitude of the magnetic field in the steel strip exceeds a predetermined amplitude of the magnetic field in the steel strip, the magnetic repulsive force of the steel strip much prevails over the magnetic attracting force of the steel strip. In the present invention, a high-frequency current strong enough to magnetically saturate the steel strip is flowed through the high-frequency current conducting paths $1a$, $1b$, whereby a necessary magnetic repulsive force can be obtained. The magnetic repulsive force of the steel strip acts on the steel strip as if non-contact springs acted on the steel strip from both sides of the steel strip. Vibration of the steel strip is damped and bowing of the steel strip is straightened by the magnetic repulsive force. Under the condition that the vibration of the steel strip is damped and the bowing of the steel strip is straightened by the magnetic repulsive force, an excess metal attaching to the steel strip is removed from the steel strip and molten metal attaches uniformly to the surfaces of the steel strip.

In the example as shown in FIGS. 2 and 3, a pair of high-frequency current conducting paths $1a$, $1b$ are positioned near a steel strip S, facing the steel strip S, the steel strip being positioned between the high-frequency current conducting paths $1a$, $1b$. A high-frequency current I of the same phase is flowed through the current conducting paths $1a$, $1b$.

Figure 4:
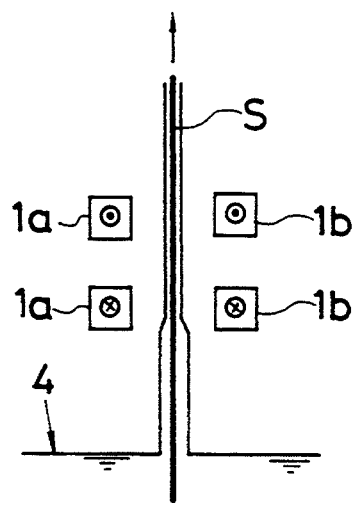
FIGS. 4(A) and 4(B) are side elevations showing another example of an apparatus for executing the method of the present invention.
Figure 4:
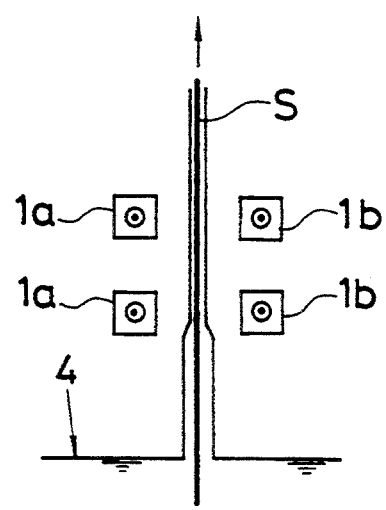

FIG. 4(A) is a side elevation showing another example of an apparatus for executing the method of the present invention.

Figure 5A:
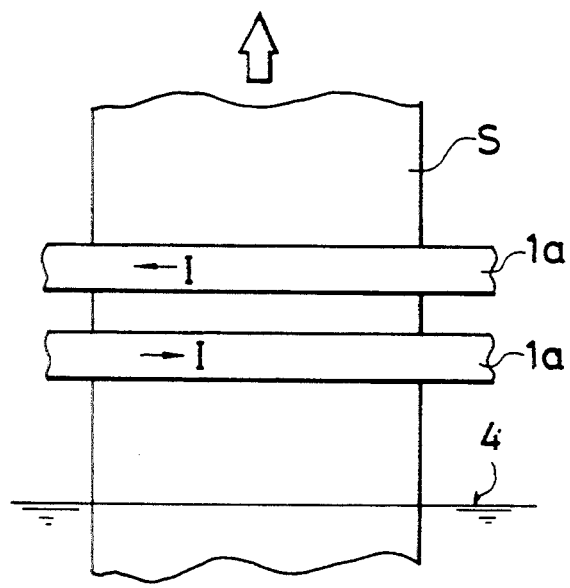
FIG. 5(A) is a front elevation Of the apparatus as shown in FIG. 4(A)
Figure 5B:
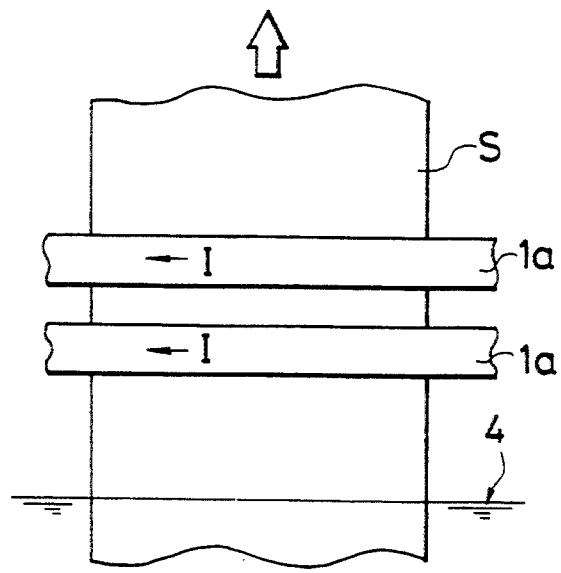
FIG. 5(B) is a front elevation of the apparatus as shown in FIG. 4(B)

FIG. 5(A) is a front elevation showing the apparatus as shown in FIG. 4(A). Two pairs of high-frequency current conducting paths $1a$, $1b$ each facing the steel strip, a steel strip being positioned between the high-frequency current conducting paths $1a$, $1b$, are arranged above and below respectively. In this example, the phase of the upper current conducting path is opposite to the phase of the lower current conducting path. In the example as shown in FIG. 4(B) and in FIG. 5(B), the phase of the upper current conducting path is equal to the phase of the lower current conducting path. The phases of the upper and lower current conducting paths can be opposite or equal to the other.

Figure 6A:
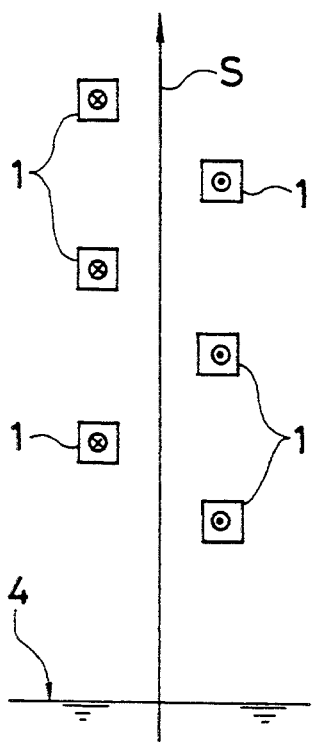
FIGS. 6(A) and 6(B) are side elevations showing another example for executing the method of the present invention.
Figure 6B:
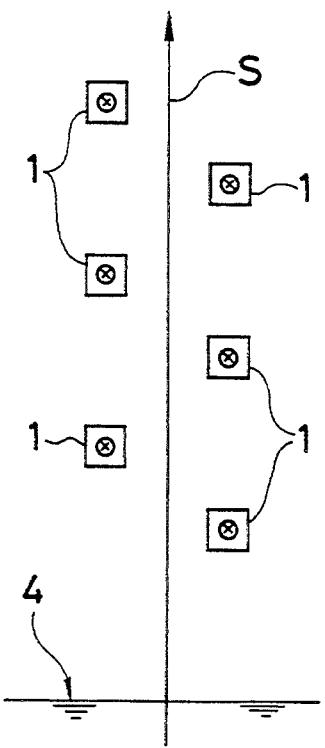

FIG. 6(A) is a side elevation showing another example of the apparatus for executing the method of the present invention High-frequency current conducting paths 1 near both sides of a steel strip are arranged, the steel strip being positioned between the High-frequency current conducting paths 1, without facing each other, being shifted upwardly and downwardly. The high-frequency current conducting paths 1 as $1a$ whole are arranged in zigzag. When a plurality of high-frequency current conducting paths are arranged near one side of the steel strip and another side thereof, the high-frequency current conducting paths are arranged in such a way as shown in FIG. 6 (A). Corresponding to a high-frequency current of each of the high-frequency current conducting paths, electric current of a phase opposite to the phase of the high-frequency current of the high-frequency current conducting paths flows through the strip S. Opposite magnetic pressures act alternately on both sides of the steel strip S perpendicularly relative to the direction of movement of the steel strip. In the example of FIG. 6 (A), the phases of the electric current flowing through the current conducting paths near both sides of the steel strip are opposite to each other. In the example of FIG. 6(B), the phases of the electric Current passing through the high-frequency current conducting paths near both sides of the steel strip are equal to each other. That is, the phases of the electric current flowing through the current conducting paths are optional.

Figure 7:
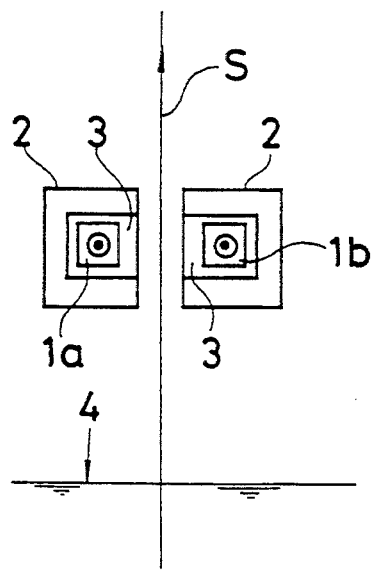
FIG. 7 is a side elevation showing another example for executing the method of the present invention.

FIG. 7 is a side elevation showing another example of the apparatus for executing the method of the present invention. High-frequency current conducting paths 1a, 1b excluding their sides facing the steel strip are enclosed by electromagnetic material 2 having a high permeability and a high saturation magnetic flux density. The inside of the electromagnetic material 2 is a water-cooled box 3. Due to a small magnetic resistance of the electromagnetic material 2, a magnetic field strong enough to saturate the steel strip can be effectively applied to the steel strip even by means of a comparatively small electric current, whereby a high magnetic pressure can be generated.

Figure 8:
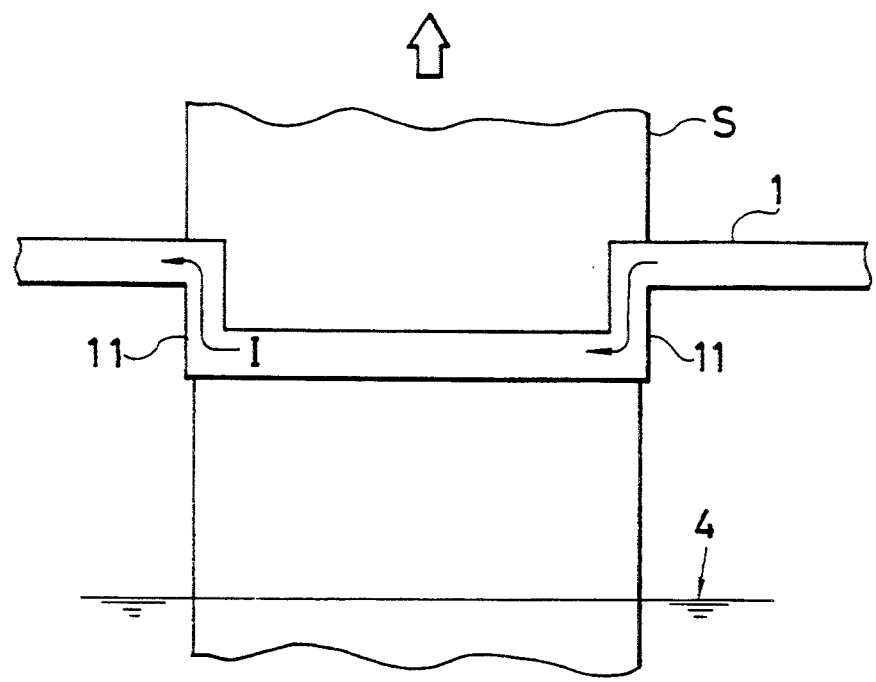
FIG. 8 is a front elevation showing another example for executing the method of the present invention.

FIG. 8 is a front elevation showing another example of the apparatus for executing the method of the present invention.

To apply a particularly strong magnetic pressure to an edge of a steel strip, a bend 11 is formed at a portion of a high-frequency current conducting path 1 facing the edge of the steel strip along the direction of movement of the steel strip. It is applicable to each of the examples as shown in FIGS. 1 to 7 to form the bend at a portion of a high-frequency current conducting path 1.

Figure 9:
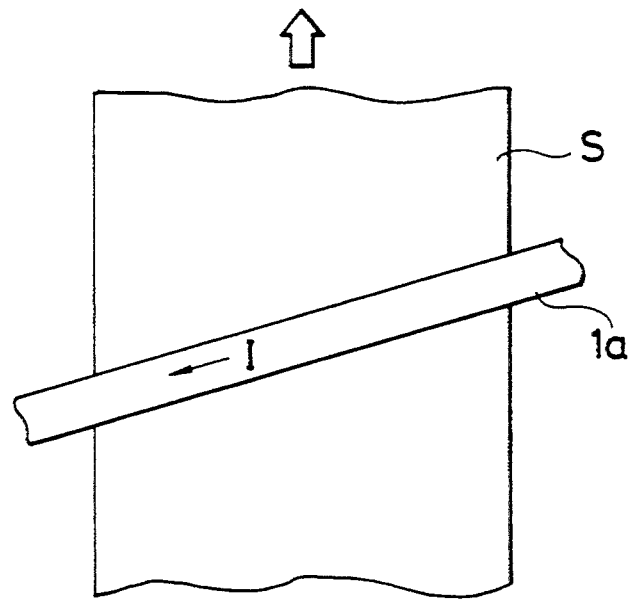
FIG. 9 is a front elevation showing another example for executing the method of the present invention.
Figure 10:
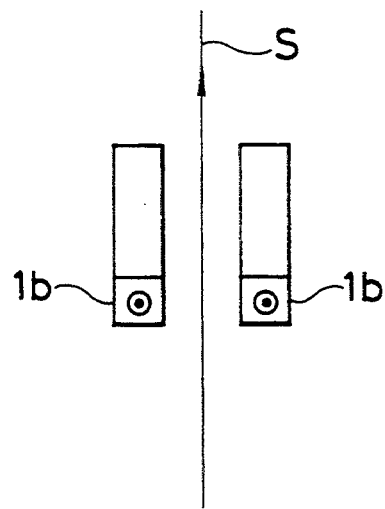
FIG. 10 is a side elevation of the apparatus as shown in FIG. 9.
Figure 11:
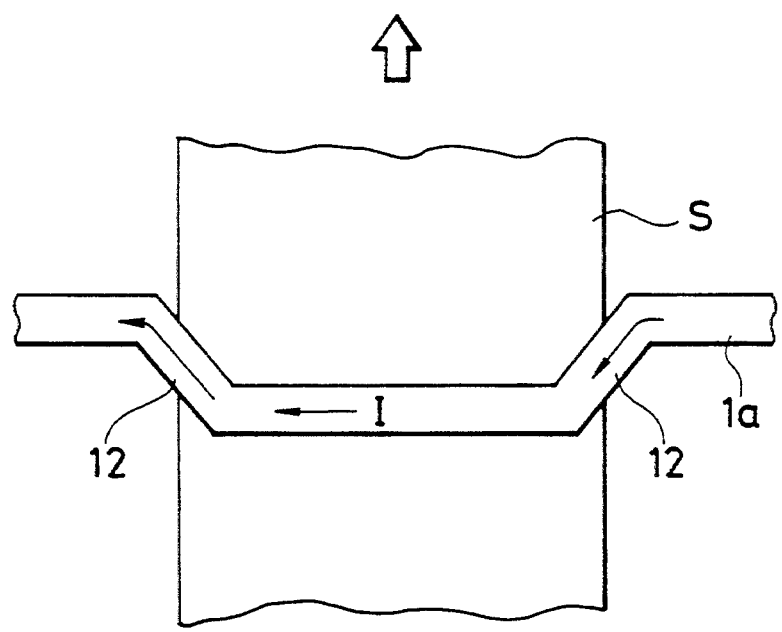
FIG. 11 is a schematic illustration showing an example of a case that parts of a high-frequency current conducting path facing a steel strip at the edges of the steel strip are inclined in a width direction of the steel strip.

Since the direction of flow of electric current through the steel strip forms an angle of 90° relative to electric current flowing through the high-frequency current conducting path, a magnetic pressure inclines to weakening near the edges of the steel strip. To prevent the magnetic pressure from weakening near the edges of the steel strip, the high-frequency current conducting path can be inclined relative to the entire length of the high-frequency current conducting path in the width direction of the steel strip or can be inclined near the edge of the steel strip. FIG. 9 is a front elevation showing another example of the apparatus for executing the method of the present invention. FIG. 10 is a side elevation showing the apparatus as shown in FIG. 9. The entire length of the high-frequency current conducting paths 1a, 1b near both sides of the steel strip are inclined in the width direction of the steel strip. FIG. 11 is an example showing the case where a portion of each of the high-frequency current conducting paths 1a, 1b is inclined in the width direction of the steel strip near the edges of the steel strip. It is applicable to each or the examples as shown in FIGS. 2 to 7 to incline the portions of the high-frequency current conducting paths near the edges of the steel strip.

The present inventors carried out a simulation analysis to calculate the magnetic pressure, on which the high-frequency current flowed through the high-frequency current conducting paths had an effect. This analysis was carried out with an apparatus as shown in FIG. 4(A). A coil having a section of 30 mm in thickness and 50 mm in width was used. Electric current of $3 \times 10^4$ A was flowed through the coil. A steel strip of 2.3 mm in thickness which had a relative permeability of 1 was used.

Figure 12:
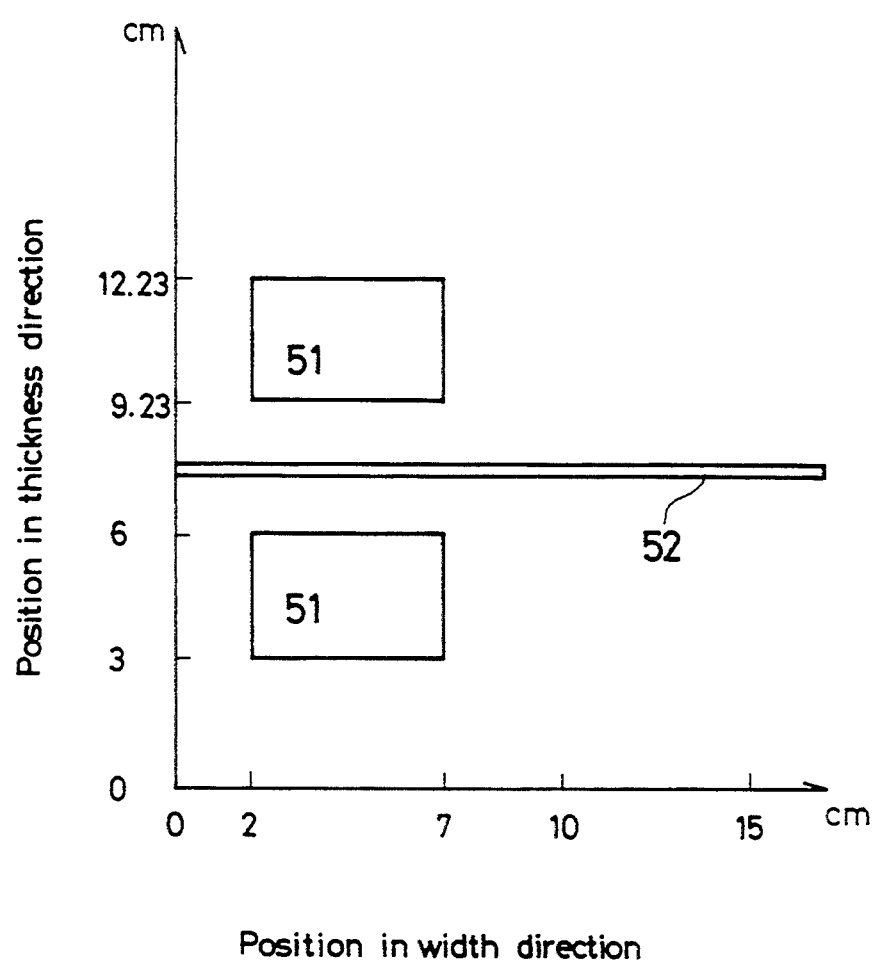
FIG. 12 is a graphical representation showing an analytic model.

FIG. 12 is a graphical representation showing an analytic model. A relative position of a coil 51 and a steel strip 52 is shown in FIG. 12.

The steel strip placed between high-frequency current conducting paths was positioned at the following levels:

(a) In the case where the steel strip was placed at the center between the high-frequency current conducting paths. The steel strip was positioned 15 mm away from each of the two high-frequency current conducting paths. The position of this steel strip corresponds to the position of the steel strip 52 in FIG. 1.

(b) In the case where the steel strip was shifted by 5 mm from the above-mentioned center toward one high-frequency current conducting path.

(c) In the case where the steel strip was shifted by 10 mm from the above-mentioned center toward one high-frequency current conducting path.

As a result of the analysis, it was understood that half an amplitude of the magnetic field intensity under the abovementioned condition was 160,000 A/m and a steel strip having a representative B-H curve as shown in FIG. 1 and Table 1 perfectly fell in the saturation area.

TABLE 1

| B (T.) | H (A/M) |
|---|---|
| 0 | 0 |
| 0.657 | 216 |
| 1.24 | 800 |
| 1.62 | 4000 |
| 1.74 | 8000 |
| 1.92 | 20000 |
| 1.983 | 30000 |
| 2.2 | 1000000 |

Figure 13:
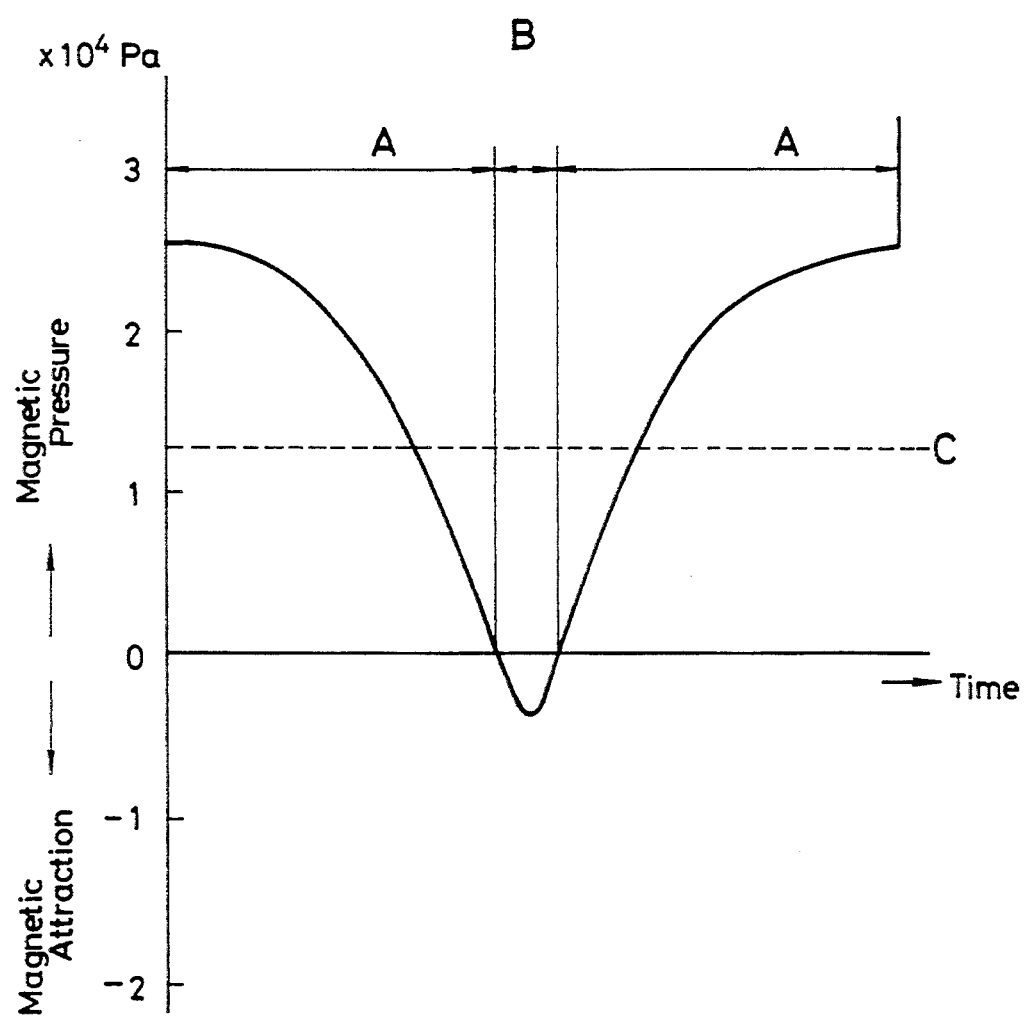
FIG. 13 is a graphical representation showing an analytic example of one cycle of the maximum magnetic pressure in the analytic model as shown in FIG. 12.

FIG. 13 is a graphical representation showing an example wherein one cycle of the maximum magnetic pressure is analyzed in the analysis model as shown in FIG. 12. Symbol A in the drawing indicates a state of the magnetic pressure in the saturation area. Symbol B indicates a state of the magnetic pressure in the nonsaturation area. Symbol C is an average value of the magnetic pressures. A period of time, during which the magnetic attracting force exceeds the magnetic pressure, is 6% or less. The maximum value of the magnetic pressures is five times greater than the magnetic attracting force. Accordingly, notwithstanding that the steel strip is a ferromagnetic body, the magnetic pressure can be applied very stably to the steel strip.

Figure 14:
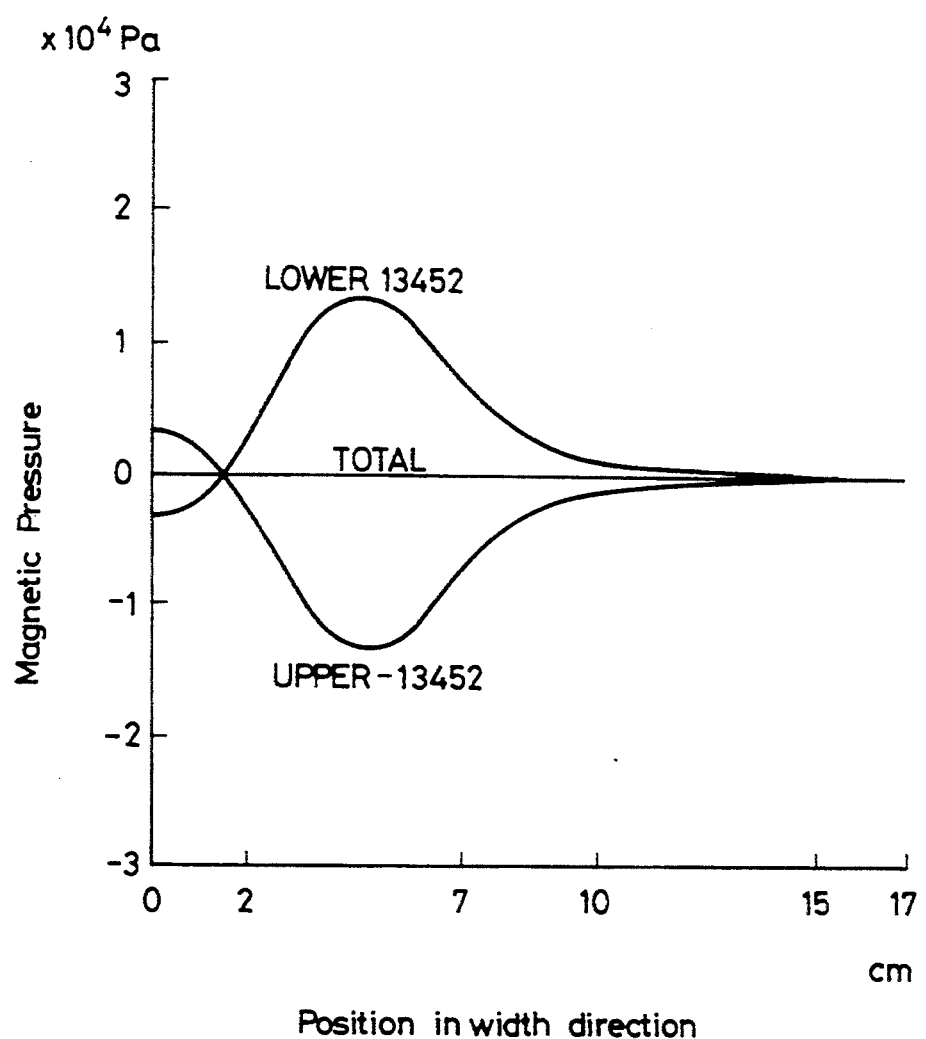
FIGS. 14(A), 14(B) and 14(C) are graphical representations showing distributions of magnetic pressures.
Figure 14:
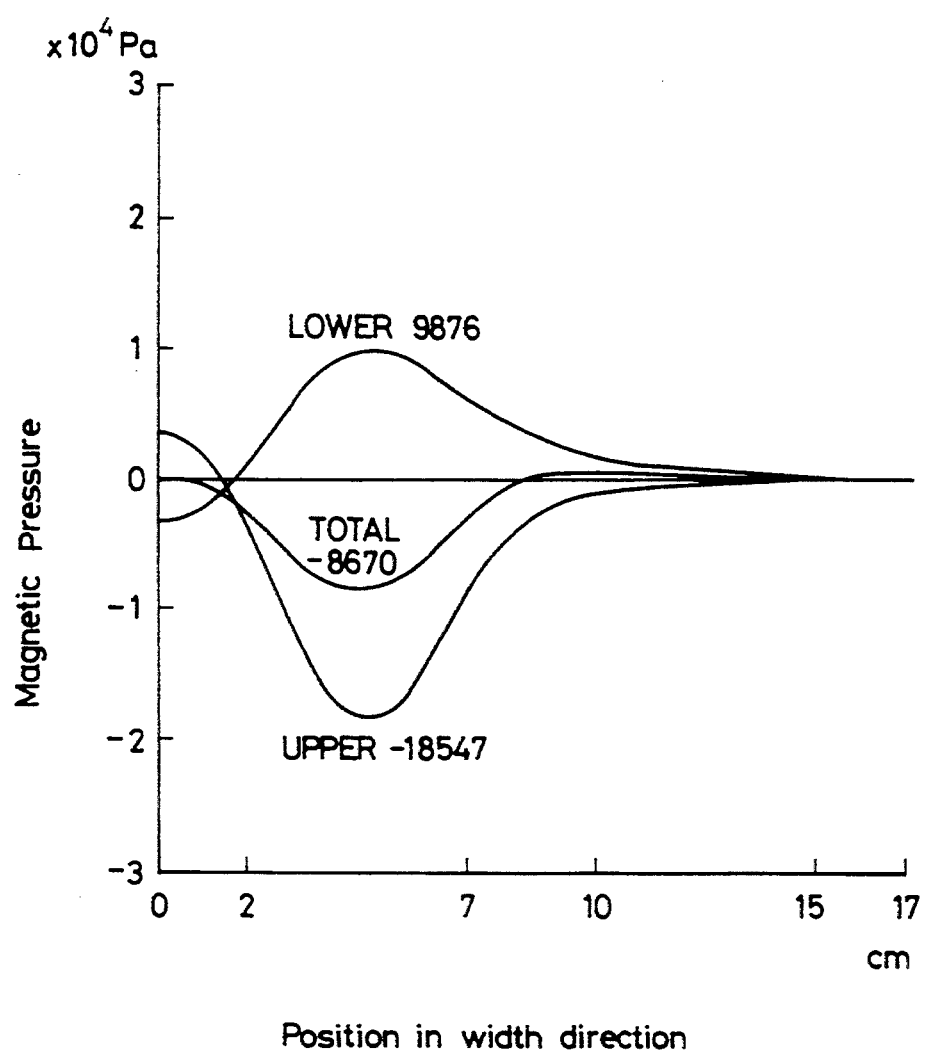
Figure 14:
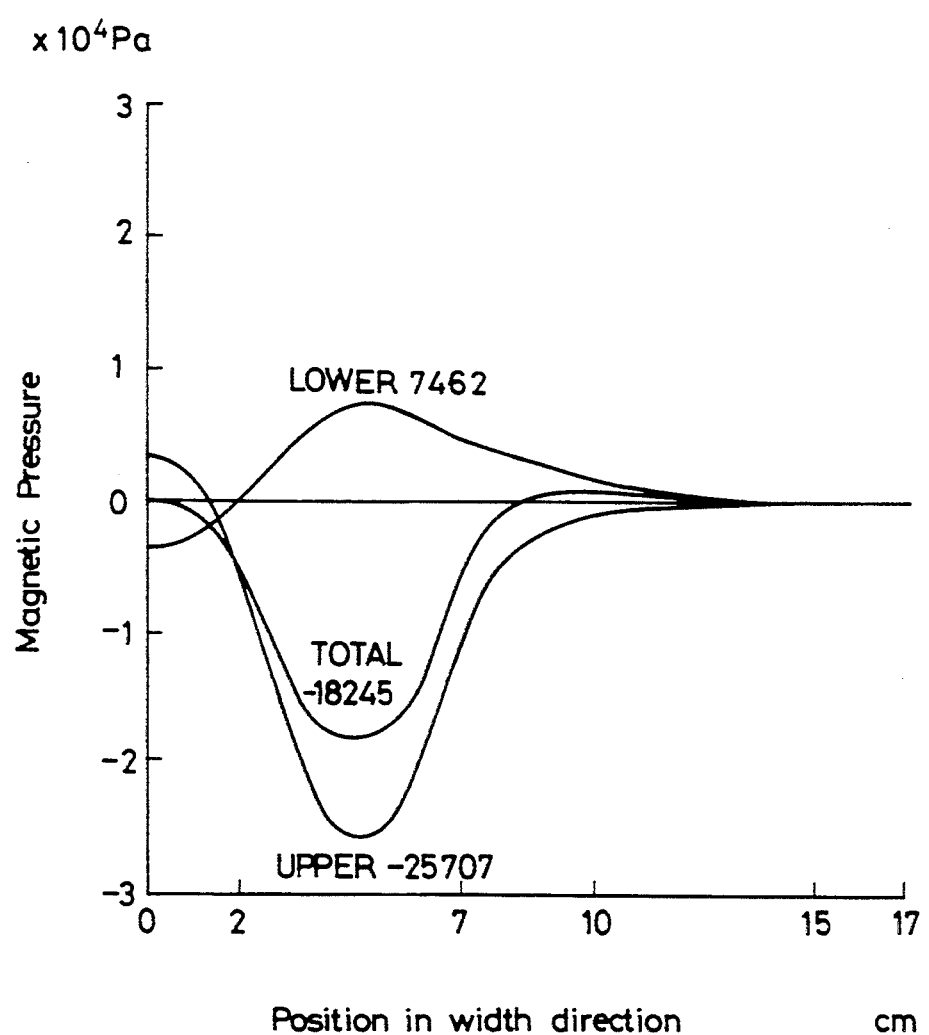

An example wherein a distribution of magnetic pressures obtained by averaging the magnetic pressures on the steel strip by time will now be shown. FIG. 14(A) is a graphical representation showing a distribution of magnetic pressures in the case-where the steel strip is centered between two high-frequency current conducting paths. FIGS. 14(B) and 14(C) are graphical representations showing a distribution of magnetic pressures in the case where the steel strip is shifted by 5 mm and 10 mm respectively from the center between the two high-frequency current conducting paths toward the high-frequency current conducting path on one side. From the distribution of the magnetic pressures in FIGS. 14(B) and 14(C), it is understood that a force pushing the steel strip toward the center works as a whole in the case where the steel strip is shifted from the center. This magnetic pressure is increased as the steel strip approaches the high-frequency current conducting path. In consequence, the magnetic pressure effectively acts on a centering work of the steel strip, which is effective in damping of vibration of the steel strip. The magnetic pressure is effective in straightening of bowing of the steel strip. Owing to the magnetic pressure, a total amount of bowing of the steel strip can be limited to 0.5 mm or less.

It was understood that the magnetic pressure as shown in FIG. 14(A) had the maximum value of 13452 Pa and this magnetic pressure was a pressure strong enough to wipe molten metal on the surface of the steel strip. An apparatus corresponding to the examples in FIGS. 4 and 5 was installed 40 mm above the surface of a coating bath and coating weight on the steel strip was controlled on the basis of the above-mentioned results. The width of the steel strip and the conditions of electric current were the same as those in the case of the aforementioned simulation analysis. The line speed was 150 m/min.

The bowing of the steel strip at positions of wiping was completely straightened and vibration of the steel strip was limited to 5 mm or less according to the present invention. There were no splash and noise as in the case of using gas wiping nozzles. The coating weight on the steel strip was controlled so that metal can attach very uniformly to the steel strip. It was confirmed that zincking of the steel strip wherein the coating weight on the steel strip was 35 g/m$^2$, which had been hard to realize by means of the prior art wiping method, was easily carried out in the method of the present invention.

A method for controlling coating weight on a steel strip by using the prior art gas wiping nozzles can be applied to the above-described method of the present invention.

Preferred Embodiment 2

In the present invention, each of the high-frequency current conducting paths is arranged near one side of a steel strip and near another side of the steel strip drawn from a coating bath. Each of the high-frequency current conducting paths is arranged in parallel with the steel strip above the surface of molten metal in the coating bath. One high-frequency current conducting path near one side of the steel strip faces the other high-frequency current conducting path, the steel strip being positioned between the high-frequency current conducting paths. North Pole and South Pole of a magnet are arranged outside the edges of the steel strip adjacent to the high-frequency current conducting paths, substantially facing each other and a width direction of the steel strip positioned between North Pole and South Pole of a magnet. The steel strip is magnetically saturated by the magnet. A high-frequency current of the same phase is flowed through the high-frequency current conducting paths and a high-frequency current of opposite phase is induced in the steel strip. A magnetic pressure acting on the surfaces of the steel strip is generated by interaction of this induced high-frequency current with the high-frequency current of the high-frequency current conducting paths. Bowing of the steel strip in the width direction of the steel strip and vibration of the steel strip are prevented by the magnetic pressure acting from both sides of the steel strip on the steel strip, and molten metal attaching to the steel strip is wiped out, whereby the coating weight on the steel strip is controlled.

Two pairs of high-frequency current conducting paths or more can be arranged at regular intervals in the direction of movement of a steel strip. Any magnet out of electromagnet and permanent magnet can be used. The magnets are arranged substantially facing each other, the steel strip being positioned between the magnets. The magnets can be arranged at two positions or more in the direction of movement of the steel strip.

Figure 15:
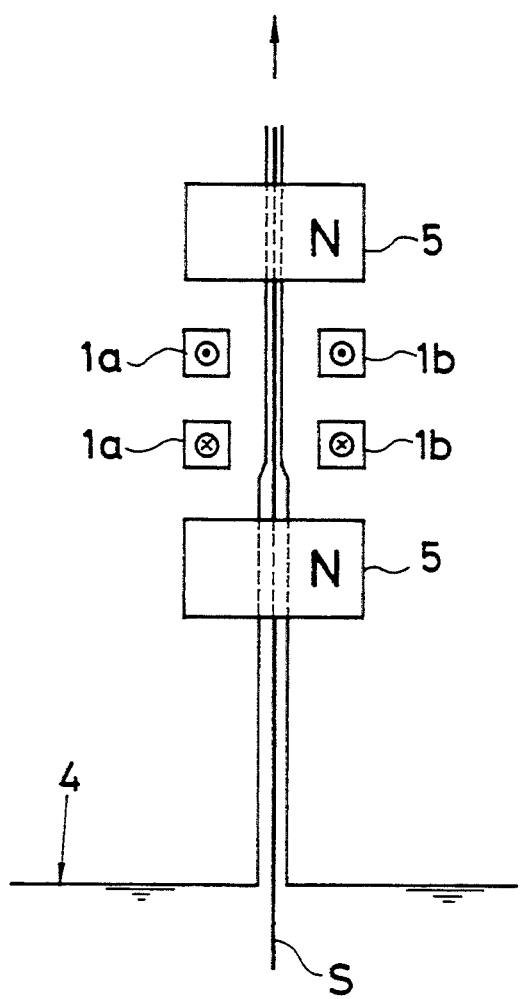
FIG. 15 is a side elevation showing an example of an apparatus for executing the method of the present invention.
Figure 16:
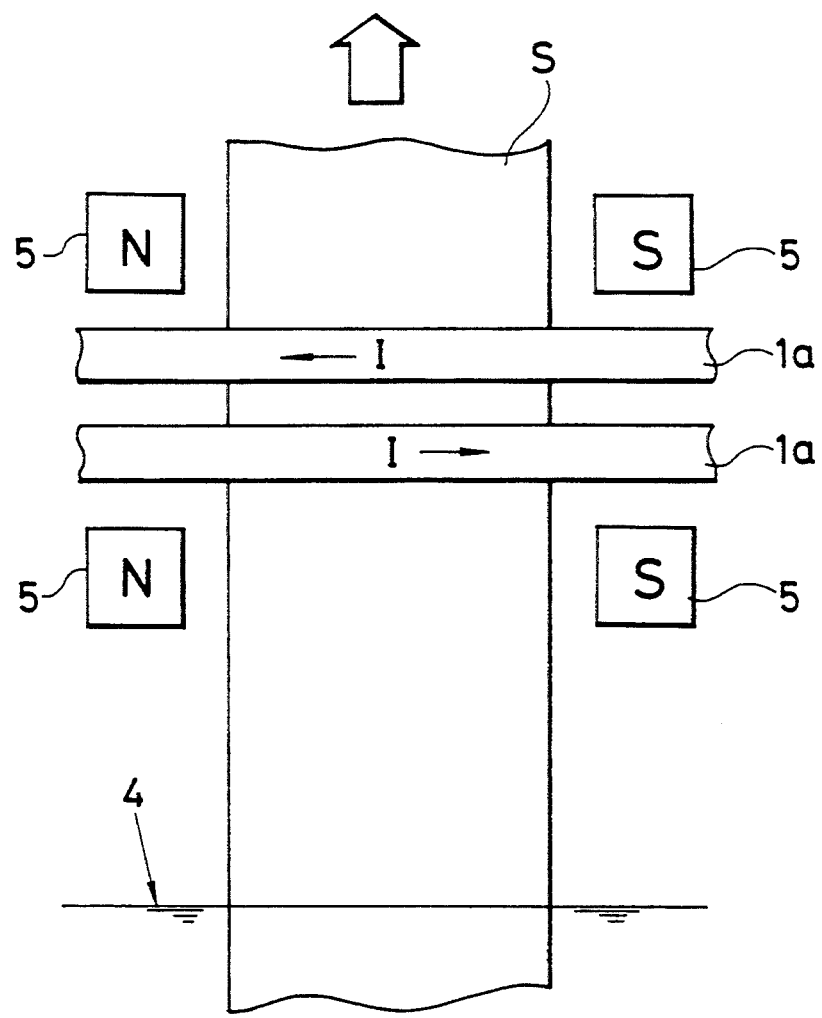
FIG. 16 is a front elevation of the apparatus as shown in FIG. 15.

FIG. 15 is a side elevation showing an example of an apparatus for executing the method of the present invention. FIG. 16 is a front elevation showing the apparatus as shown in FIG. 15.

A steel strip S is continuously drawn out of a coating bath 4. Each of the high-frequency current conducting paths 1a, 1b are arranged in parallel with each of the sides of the steel strip S near the steel strip and above the surface of molten metal in the coating bath. North Pole and South Pole of a magnet 5 are positioned near the high-frequency current conducting paths 1a, 1b, substantially facing each other, a width direction of the steel strip being positioned between North Pole and South Pole of a magnet 5, outside both edges of the steel strip. Both the high-frequency current conducting paths 1a, 1b near both sides of the steel strip are arranged at an upper position and a lower position in the height direction.

The magnets are arranged above and below the high-frequency current conducting paths 1a, 1b respectively.

When a high-frequency current of the same phase is flowed through the high-frequency current conducting paths 1a, 1b, an electric current of a phase opposite to the phase of the high-frequency current flows through the steel strip S. Symbol ⊙ of an upper high-frequency current conducting path 1a and symbol ⊙ of a high-frequency current conducting path 1b show that they have the same phase. Symbol ⊖ of a lower high-frequency current conducting path 1a and symbol ⊖ of a high-frequency current conducting path 1b show that they have the same phase. In this example, the phase of the upper high-frequency current conducting path 1a and the phase of the lower high-frequency current conducting path 1a are opposite to each other, but they can be equal to each other. Since an electric current flowing through the steel strip S flows in the direction opposite to a flow of electric current flowing through the high-frequency current conducting path, a magnetic repulsive force of the steel strip, namely a magnetic pressure of the steel strip acts on the surfaces of the steel strip. However, since a ferromagnetic body such as the steel strip has a high permeability, a magnetic attracting force exceeds a magnetic repulsive force when an electric current is simply flowed, whereby the steel strip comes to be in an unstable state. The magnets 5 arranged outside both edges of the steel strip magnetically saturate the steel strip to remove the abovementioned unstable state. That is, the magnetic field in the steel strip comes to be present in a magnetically saturated area due to the work of the magnets 5. The range of variation of magnetic field generated by the high-frequency current also comes to be present in the magnetically saturated area. The steel strip undergoes only a repulsive force from the high-frequency current conducting paths by magnetically saturating a ferromagnetic body and causing the ferromagnetic body to be paramagnetic. In consequence, the unstable state due to the magnetic attracting force can be removed. This repulsive force works like a non-contact spring. Vibration of the steel strip is restrained by the magnetic repulsive force and bowing of the steel strip is straightened. Under the condition that vibration of the steel strip is restrained by the magnetic repulsive force and bowing of the steel strip is straightened, an excess molten metal attaching to the steel strip is removed by the magnetic pressure acting on the steel strip from both sides of the steel strip, and the molten metal uniformly attaches to the surfaces of the steel strip.

Figure 17:
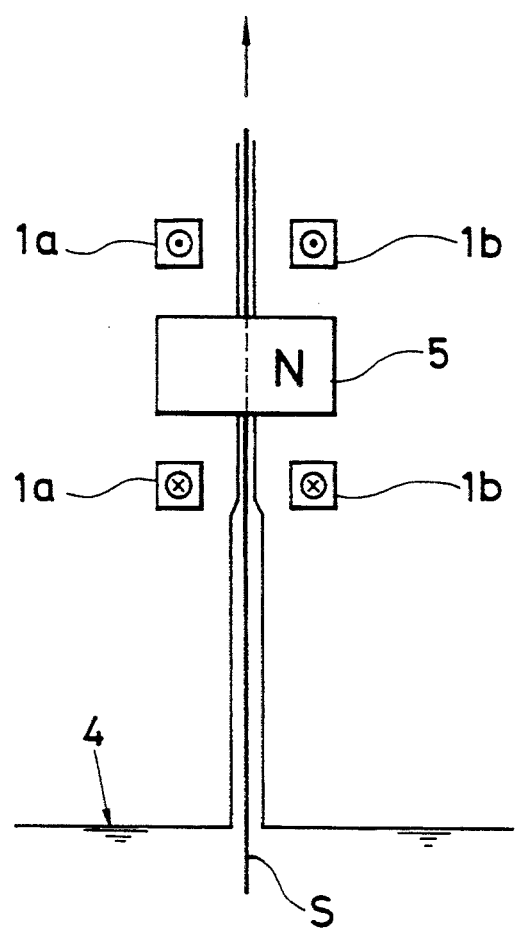
FIG. 17 is a side elevation showing an example of an apparatus for executing the method of the present invention.
Figure 18:
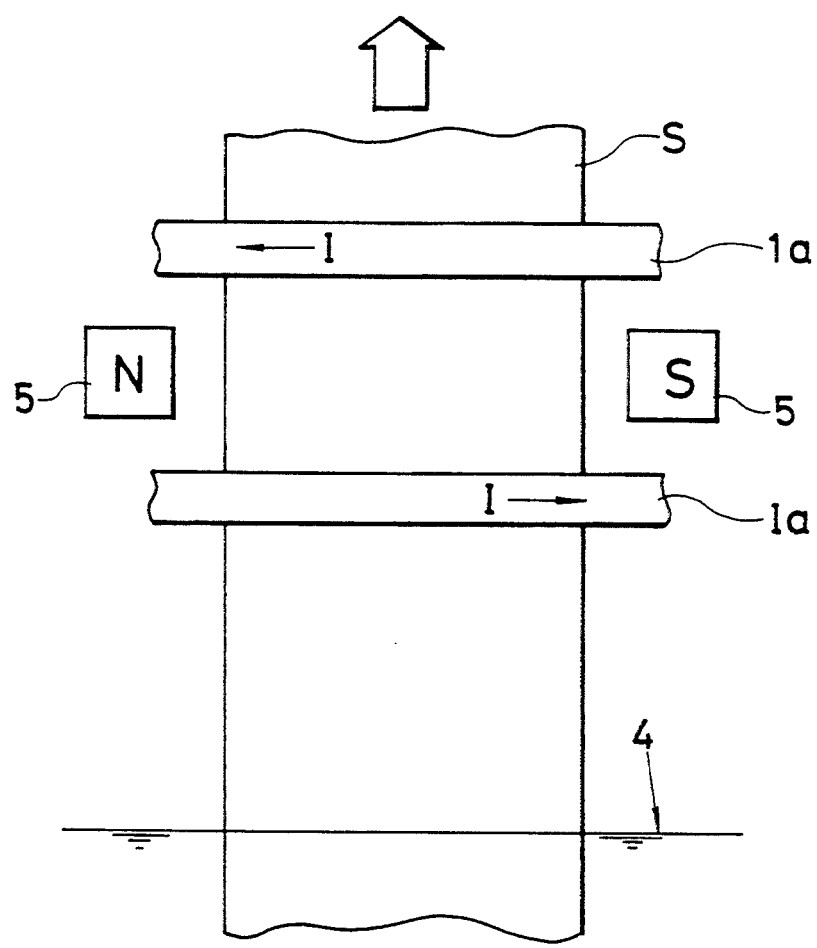
FIG. 18 is a front elevation showing the apparatus as shown in FIG. 17.

FIG. 17 is a side elevation showing an example of an apparatus for executing the method of the present invention. FIG. 18 is a front elevation showing the apparatus as shown in FIG. 17. In the examples as shown in FIGS. 17 and 18, North Pole and South Pole of a magnet are positioned between two pairs of high-frequency current conducting paths, out of which one is positioned above and the other below. An electric current is flowed through the above two pairs of high-frequency current conducting paths as is in the examples of FIGS. 15 and 16.

Figure 19:
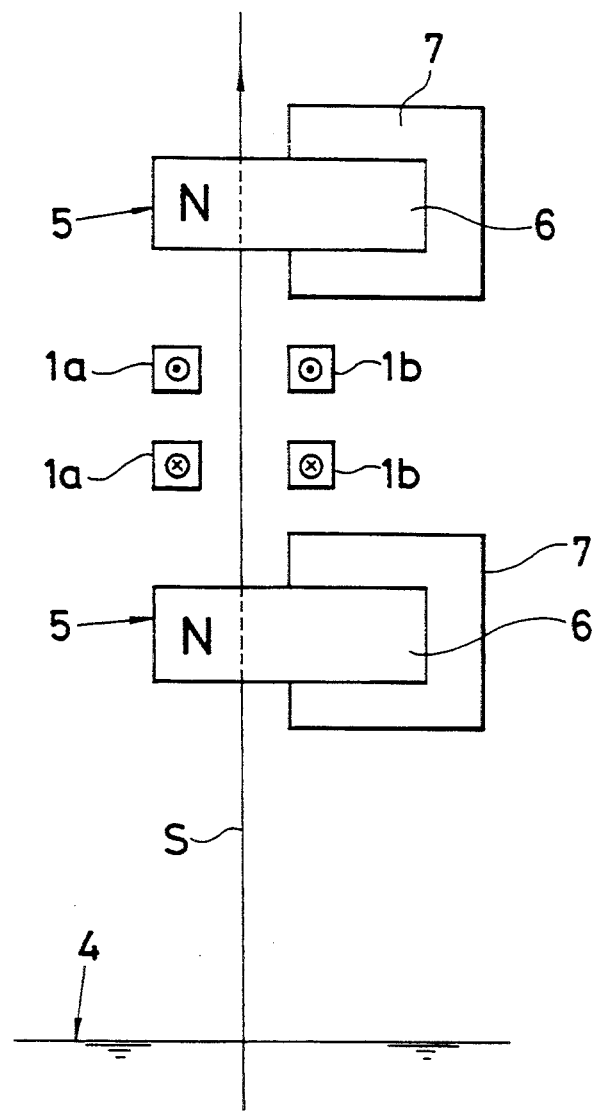
FIG. 19 is a side elevation showing an example of an apparatus for executing the method of the present invention.
Figure 20:
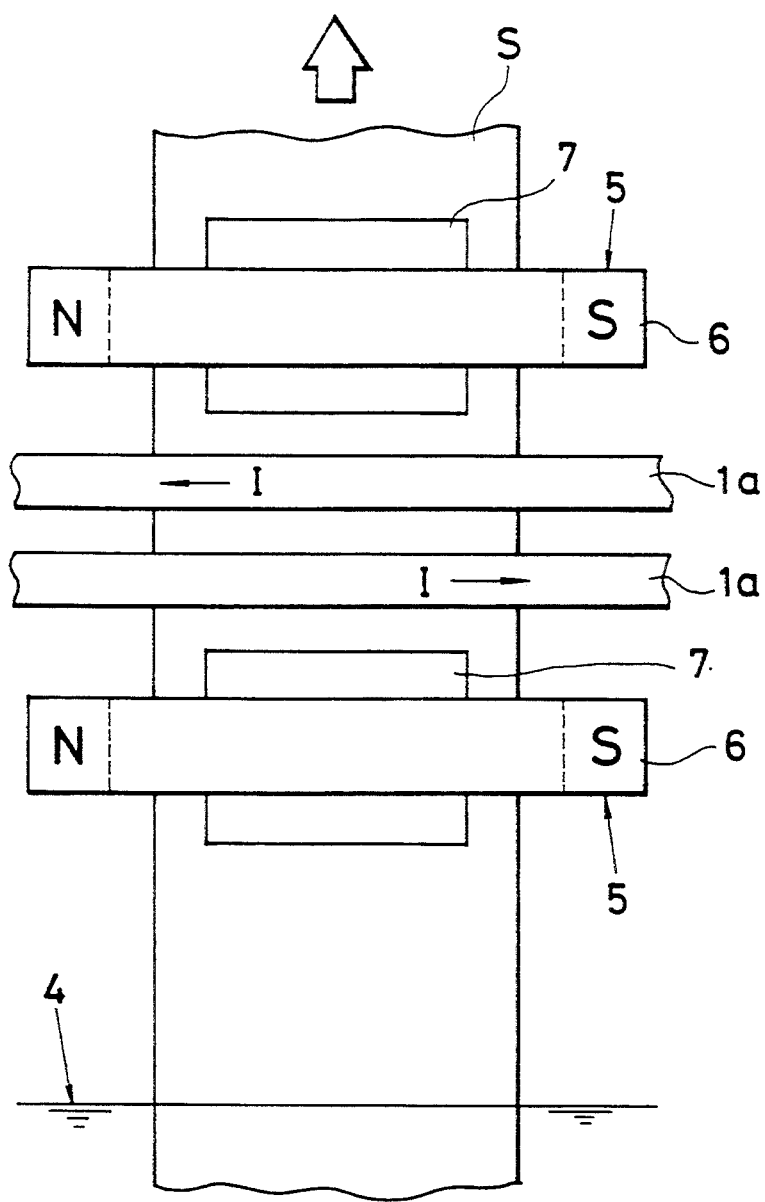
FIG. 20 is a front elevation of the apparatus as shown in FIG. 19.

FIG. 19 is a side elevation showing an example of an apparatus for executing the method of the present invention. FIG. 20 is a front elevation showing the apparatus as shown in FIG. 19. In the examples as shown in FIGS. 19 and 20, high-frequency current conducting paths and magnets are arranged in such a manner as shown in FIGS. 15 and 16, but a magnet 5 is composed Of electromagnets. Each of the electromagnets is composed of a yoke 6 and a coil 7.

Figure 21:
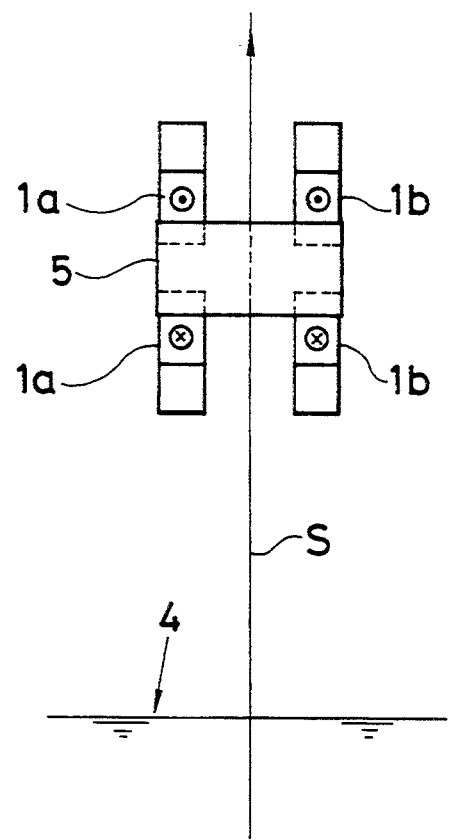
FIG. 21 is a side elevation showing an example of an apparatus for executing the method of the present invention.
Figure 22:
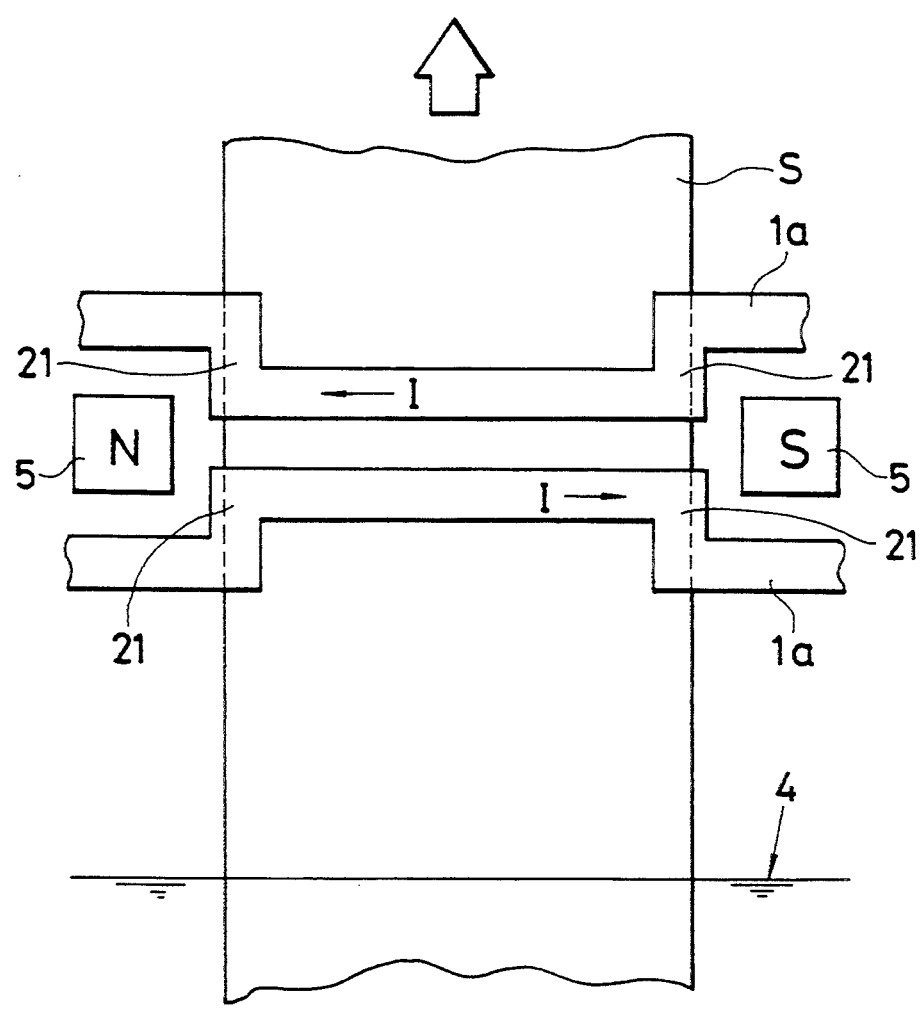
FIG. 22 is a front elevation of the apparatus as shown in FIG. 21.

FIG. 21 is a side elevation showing an example of an apparatus-for executing the method of the present invention. FIG. 22 is a front elevation of the apparatus as shown in FIG. 21. Two pairs of high-frequency current conducting paths. 1a, 1b, out of which one is positioned above and the other below, are arranged. The magnets 5 are positioned between the upper and lower high-frequency current conducting paths. To apply a particularly strong magnetic pressure to the edges of the steel strip, bends 21 are formed along the direction of movement of the steel strip at positions where the high-frequency current conducting paths 1a, 1b face the edges of the steel strip.

Since the direction of flow of electric current flowing through the steel strip near the edges of the steel strip forms an angle of 90° relative to the direction of electric current flowing through the high-frequency current conducting paths, the magnetic pressure inclines to weakening near the edges of the steel strip. To prevent the magnetic pressure from weakening, the high-frequency current conducting path is needed to incline relative to the entire length of the high-frequency current conducting path in the width direction of the steel strip as shown in FIGS. 9 and 10 or the high-frequency current conducting path can be inclined near the edges of the steel strip.

Figure 23:
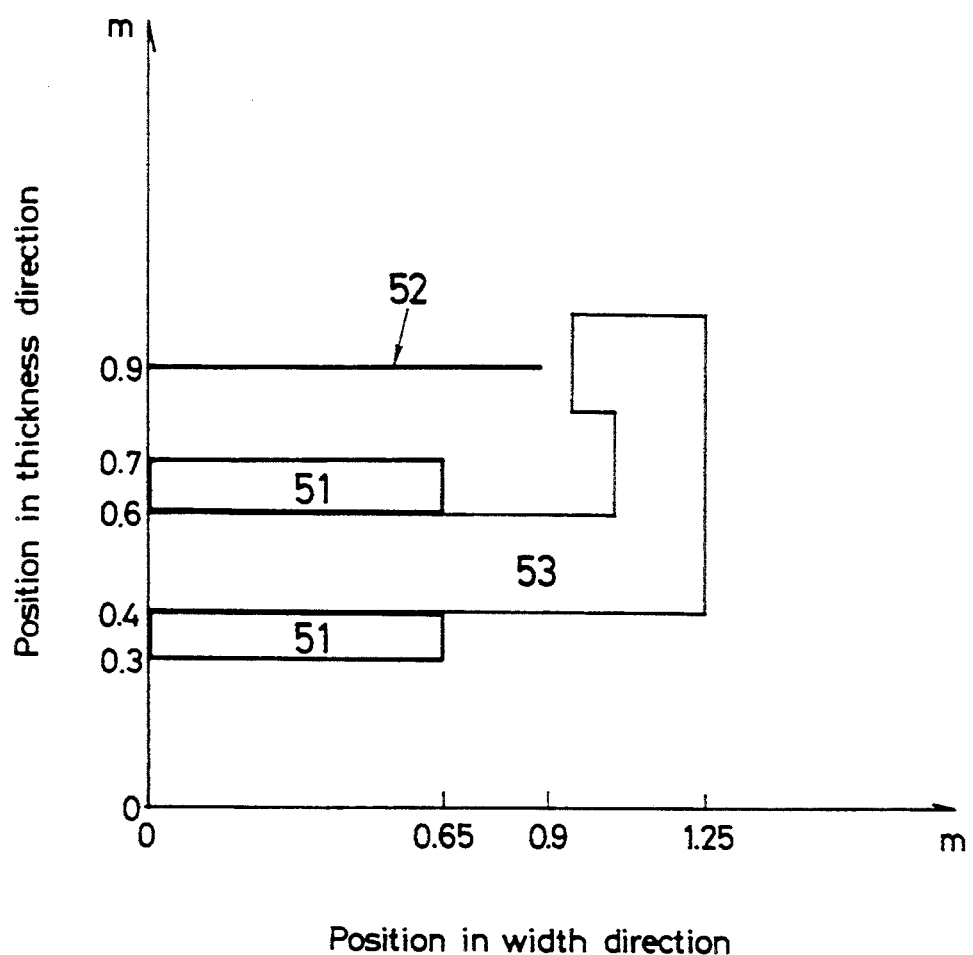
FIG. 23 is a graphical representation showing an analytic model.
Figure 24:
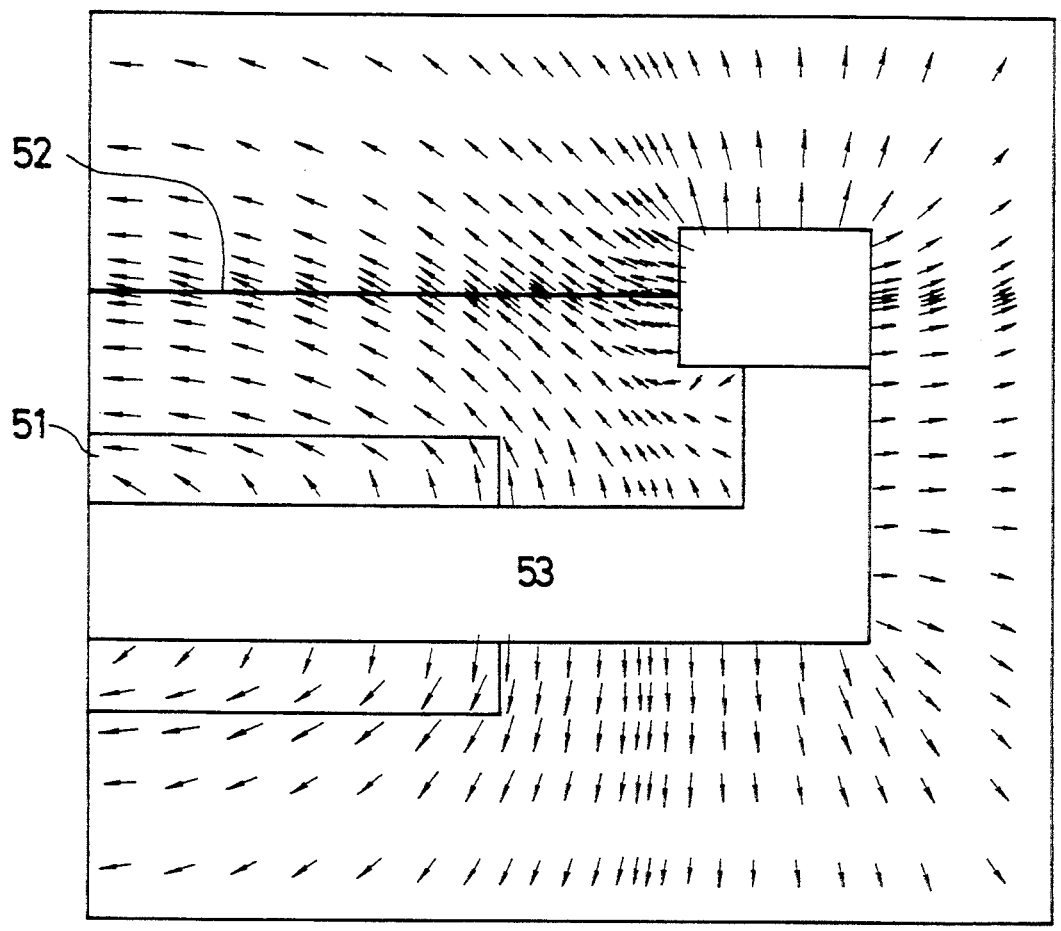
FIG. 24 is a schematic illustration showing a distribution of magnetic fields obtained by an analysis.

The present inventors carried out a simulation analysis to calculate the magnetic pressure acting on the steel strip under the influence of the high-frequency current flowed through the high-frequency current conducting path. Firstly, to confirm the fact that the steel strip was magnetically saturated by the electromagnet, a static magnetic field of the electromagnet and the steel strip in the structure of the apparatus as shown in FIGS. 19 and 20 was analyzed. FIG. 23 is a graphical representation showing an analytic model. In the-drawing, a relative position of a steel strip 52 and an iron core 53 is indicated. The analytic condition is as follows:

Non-permeability of iron core: 1000
Electric current in coil: $2.6 \times 10^5$ A
Size of steel strip: width 1800 mm thickness 2.3 mm A distribution of magnetic fields obtained by the analysis is shown in FIG. 24. A magnetic field intensity in the ferromagnetic body indicated $6 \times 10^5$ A/m or more. This means that the steel strip is sufficiently magnetically saturated, that is, the steel strip fell in the saturation area.

On the basis of those results, an apparatus corresponding to the examples in FIGS. 19 and 20 was installed 40 mm above molten metal in a coating bath, and coating weight on the steel strip was controlled. The width of the steel strip and the condition of electric current were determined as were in the case of the aforementioned simulation analysis, and the line speed was 150 m/min.

The bowing of the steel strip at the positions of wiping was straightened, and the vibration of the steel strip was restrained within the range of 1 mm or less by the present invention. There were no splash and noise as in the case of using gas wiping nozzles. Therefore, the coating weight on the steel strip was very uniformly controlled. It was confirmed that zincking of a steel strip with coating weight of 35 g/m² attaching to the steel strip which had been hard to carry out at a line speed of 150 m/min in the prior art gas wiping method could be easily carried out.

A method for controlling coating weight on a steel strip by using the prior art gas wiping nozzles can be applied to the above-described method of the present invention.

Preferred Embodiment 3

In the present invention, wiping nozzles are arranged near both edges of a steel strip drawn out of a coating bath. High-frequency current conducting paths are positioned in the wiping nozzles. Gas is jetted on the steel strip drawn from the coating bath. A high-frequency current strong enough to magnetically saturate the steel strip is flowed through the high-frequency current conducting paths, and a high-frequency current of opposite phase is induced in the steel strip. A magnetic pressure acting on the surfaces of the steel strip is generated by interaction of this induced high-frequency current with the high-frequency current flowed through the high-frequency current conducting paths. A coating weight on the steel strip is controlled by the magnetic pressure working from both sides of the steel strip and the gas jetted from the wiping nozzles. Further, bowing of the steel strip in the width direction of the steel strip and vibration of the steel strip are prevented by the magnetic pressure working from both sides of the steel strip.

In the present invention, two pairs of high-frequency current conducting paths or more can be arranged at regular intervals in the direction of movement of the steel strip. That is, two pairs of high-frequency current conducting paths or more can be positioned in the nozzles at regular intervals in the direction of movement of the steel strip. Separately from the nozzles, the high-frequency current conducting paths can be arranged above and below the nozzles.

A pair of the wiping nozzles, into which the high-frequency current conducting paths are included, are positioned, facing each other, the steel strip being positioned between the wiping nozzles. A high-frequency current of the same phase is flowed through the facing high-frequency current conducting paths.

In the case where a plurality of high-frequency current conducting paths are arranged near both sides of a steel strip, wiping nozzles, into which the high-frequency current conducting paths are included, need not face steel strip, the steel strip being positioned between the wiping nozzles. The high-frequency current conducting paths can be arranged, being shifted in the direction of movement of the steel strip. In this case, there is no limit to the phase of electric current flowed through the high-frequency current conducting paths.

The high-frequency current conducting paths included into the nozzles are arranged in the width direction of the steel strip, but need not always be arranged in parallel with the width direction of the steel strip. The entire length of the high-frequency current conducting path can be inclined relative to the width direction of the steel strip. Parts of the high-frequency current conducting path can be inclined relative to the width direction of the steel strip. Since a direction of flow of electric current flowing through the steel strip near the edges of the steel strip forms an angle of 9020 to a direction of flow of electric current flowing through the high-frequency current conducting path, a magnetic pressure near the edges of the steel strip inclines to weakening. To prevent the magnetic pressure from weakening near the edges of the steel strip, the entire length of the high-frequency current conducting path can be inclined relative to the width direction of the steel strip or the high-frequency current conducting path can be inclined near the edges of the steel strip. As described above, in the case where the parts of the high-frequency current conducting path or the entire length of high-frequency current conducting path are inclined, the nozzles can be inclined. Only the high-frequency current conducting paths in the nozzles can be inclined.

Figure 25:
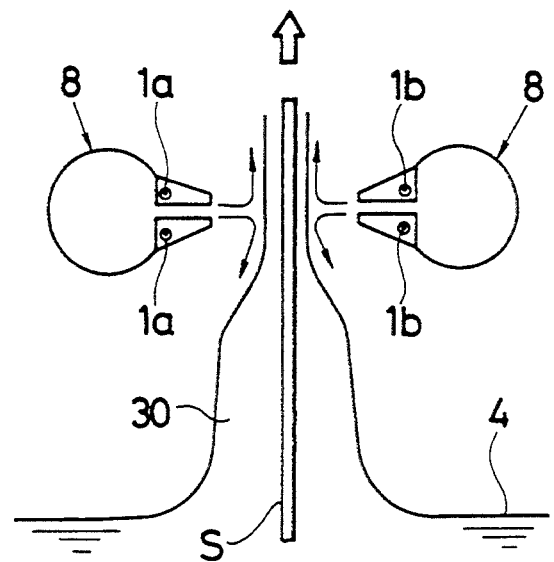
FIG. 25 is a side elevation showing an example of an apparatus for executing the method of the present invention.
Figure 26:
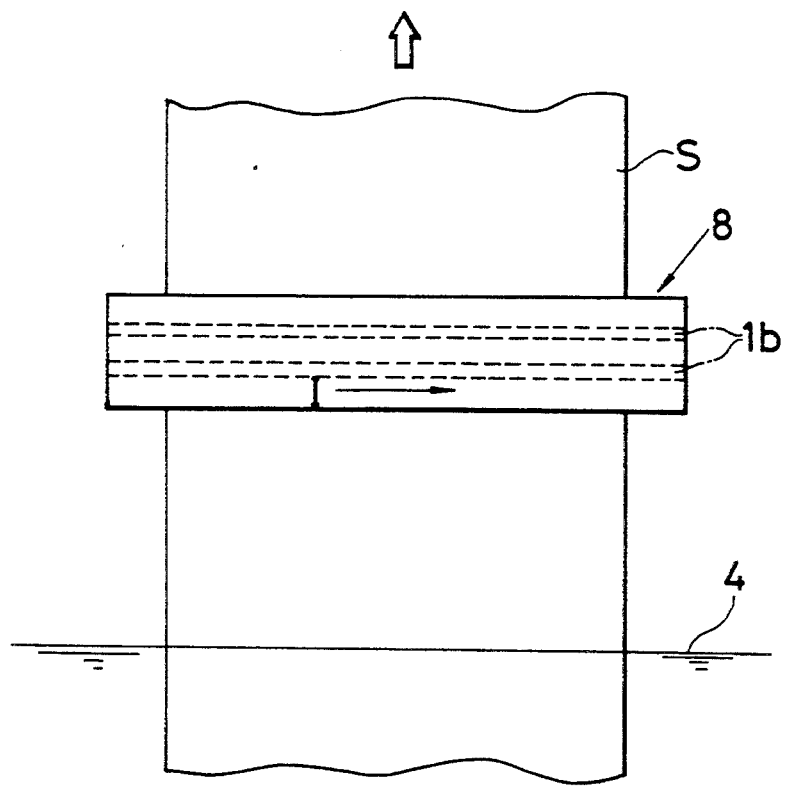
FIG. 26 is a front elevation of the apparatus as shown in FIG. 25.

FIG. 25 is a side elevation showing an example of an apparatus for executing the method of the present invention. FIG. 26 is a front elevation of the apparatus as shown in FIG. 25.

A steel strip is continuously drawn out of a coating bath 4. Gas wiping nozzles 8 are arranged above the coating bath 4 near one side of the steel strip S and near another side of the steel strip S. Two gas wiping nozzles 8 face each other, the steel strip S being positioned between the gas wiping nozzles 8.

The gas wiping nozzles have high-frequency current conducting paths 1a, 1b at their ends. Each of the high-frequency current conducting paths 1a, 1b is parallel with the surface of the steel strip. In this example, two pairs of high-frequency current conducting paths are positioned above and below nozzle slit of each of the nozzles. When a high-frequency current of the same phase is flowed through the high-frequency current conducting paths 1a, 1b, an electric current of phase opposite to the phase of the high-frequency current flows through the steel strip S. Symbol ⊙ of the high-frequency current conducting path 1a and symbol ⊙ of the high-frequency current conducting path 1b show the same phase. Since the electric current flowing through the steel strip flows opposite the electric current-flowing through the high-frequency current conducting path, a magnetic repulsive force, namely, a magnetic pressure acts on the surfaces of the steel strip. However, since a ferromagnetic body such as a steel strip has a high permeability, a magnetic attracting force exceeds a repulsive force when an electric current is simply flowed, which gives rise to an unstable state of the steel strip. When the electric current of the high-frequency current conducting paths 1a, 1b is increased, an amplitude of the magnetic field in the steel strip as shown in FIG. 1 is increased and a retention time, during which the steel strip is retained in a saturation area, is increased. As a result, the magnetic repulsive force much prevails over the magnetic attracting force when the amplitude of the magnetic field exceeds a predetermined amplitude of the magnetic field. In the present invention, a high-frequency current strong enough to magnetically saturate the steel strip is flowed through the high-frequency current conducting paths 1a, 1b, and a necessary magnetic repulsive force can be obtained. Vibration of the steel strip is damped and bowing of the steel strip is straightened by the magnetic repulsive force of the steel strip. Under the condition that vibration of the steel strip is damped and bowing of the steel strip is straightened by the magnetic repulsive force of the steel strip, an excess molten-metal 30 attaching to the steel strip is removed from the steel strip by the magnetic pressure acting on the steel strip from both sides of the steel strip, and molten metal attaches uniformly to the surfaces of the steel strip. That is, the magnetic pressure acts on positions of wiping whereby the vibration and bowing of the steel strip are restrained, and the surfaces of the steel strip is wiped by the magnetic pressure and the pressure of the gas wiping. Even though the pressure of wiping gas is low, molten metal on the surfaces of the steel strip is appropriately and effectively removed. Moreover, smoothness on coating surfaces of the steel strip is appropriately maintained.

Figure 27:
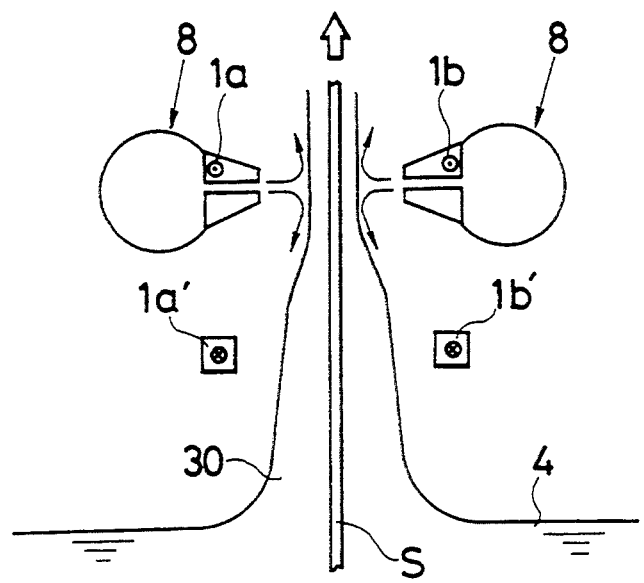
FIG. 27 is a side elevation showing another example of an apparatus for executing the method of the present invention.
Figure 28:
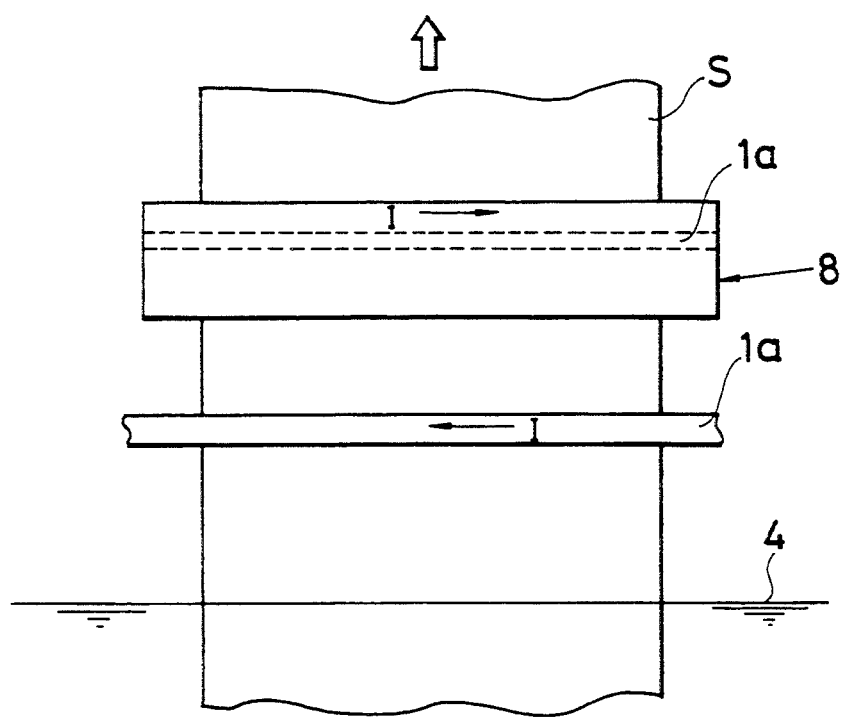
FIG. 28 is a front elevation of the apparatus as shown in FIG. 27.

FIG. 27 is a side elevation showing another example of an apparatus for executing the method of the present invention. FIG. 28 is a front elevation showing the apparatus as shown in FIG. 27. High-frequency current conducting paths 1a, 1b are included into each of tip nozzles in wiping nozzles 8 facing each other. Other high-frequency current conducting paths 1a', 1b' are arranged near both sides of a steel strip. In this example, phases of upper and lower high-frequency currents are opposite to each other, but they can have the same phase.

Figure 29:
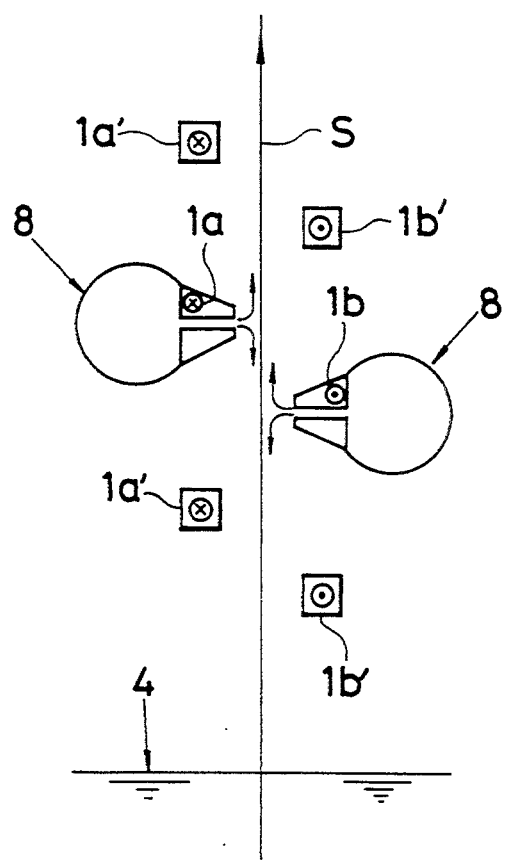
FIG. 29 is a side elevation showing another example of an apparatus for executing the method of the present invention.

FIG. 29 is a side elevation showing another example of an apparatus for executing the method of the present invention. High-frequency current conducting paths 1a, 1b are included into wiping nozzles 8. The wiping nozzles 8 near both sides of a steel strip do not face each other, the steel strip being positioned between the wiping nozzles 8, but the wiping nozzles 8 are arranged, being shifted above and below. Other high-frequency current conducting paths 1a', 1b' are arranged above and below each of the wiping nozzles 8. As a whole, the high-frequency current conducting paths are arranged in zigzag. An electric current of phase opposite to the high-frequency current flows through the steel strip in response to high-frequency current of each of the high-frequency current conducting paths. A magnetic pressure acts on the steel strip S alternately from opposite sides in the direction of movement of the steel strip. In the example of FIG. 29, the phases of the electric current flowing through the high-frequency current conducting paths are opposite to each other near one side of the steel strip and near another side of the steel strip, the phases of the electric current can be the same. That is, the phases of the electric current flowing through the high-frequency current conducting paths are optional.

Since the direction of the electric current flowing through the steel strip near the edges of the steel strip forms an angle of 90° to the electric current flowing through the high-frequency current conducting paths, the magnetic pressure of the steel strip inclines to weakening at the edges of the steel strip. To prevent the magnetic pressure from weakening near the edges of the steel strip, the high-frequency current conducting path can be inclined relative to the entire length of high-frequency current conducting path in the width direction of the steel strip or the high-frequency current conducting path can be inclined near the edges of the steel strip. To prevent the magnetic pressure from weakening near the edges of the steel strip, the high-frequency current conducting path can be inclined relative to the entire length of the high-frequency current conducting path as shown in FIGS. 9 and 10 or the high-frequency current conducting path can be inclined near the edges of the steel strip.

An apparatus corresponding to the apparatus as shown in FIGS. 27 and 28 was installed at 400 mm above a coating bath on the basis of the above-mentioned result, and coating weight on a hot-dipping steel strip was controlled. The width of the steel strip and the condition of electric current were the same as those of the above simulation analysis. The line speed was 150 m/min. The flow speed of gas was 190 m/s.

The bowing of the steel strip at the positions of wiping was perfectly straightened by the present invention. The vibration of the steel strip was restrained within the range of 1 mm or less. There were no splash and noise as in the case of using gas wiping nozzles, and coating weight of the steel strip was very uniformly controlled. It was confirmed that zincking of steel strip with coating weight of 35 g/m² which had been hard to carry out in the prior art gas wiping method could be easily carried out.

What is claimed is:

1. An improved method of controlling a coating weight on a hot-dipped steel strip, comprising the steps of:
    positioning wiping nozzle means adjacent first and second surfaces of a steel strip that is drawn out of a coating bath;
    positioning alternating current conducting paths in said wiping nozzle means, each of said alternating current conducting paths being positioned in said wiping nozzle means so as to be respectively in parallel with each of the first and second surfaces of the steel strip above the coating bath;
    each of said alternating current conducting paths having a small cross-sectional area relative to a surface area of each of said first and second surfaces of said steel strip positioned adjacent to said alternating current conducting paths;
    jetting gas from the wiping nozzle means onto the steel strip that has been drawn out of the coating bath; and
    magnetically saturating the steel strip by flowing alternating currents through said alternating current conducting paths to generate an induced alternating current in the steel strip, that has a phase that is opposite to a phase of the alternating currents flowing through said alternating current conducting paths, thereby creating a peak value in a magnetic pressure that acts on areas of the first and second surfaces of the steel strip that are small relative to the surface area of each of the first and second surfaces of the steel strip, said magnetic pressure being generated by an interaction of the induced alternating current with the alternating currents flowing through the alternating current conducting paths whereby control of said coating weight on said hot-dipped steel strip is improved by providing said peak magnetic pressure on said areas of said first and second surfaces of said steel strip that are small relative to the surface area of each of the first and second surfaces of the steel strip.

2. An improved method for controlling a coating weight on a hot-dipped steel strip, comprising the steps of:
    positioning at least first and second alternating current conducting paths respectively adjacent a first and a second surface of a steel strip that is drawn out of a coating bath, each of the at least first and second alternating current conducting paths having a small cross-sectional area relative to a surface area of each of said first and second surfaces of said steel strip positioned adjacent to the at least first and second alternating current conducting paths, the at least first and second alternating current conducting paths being positioned to be in parallel with the first and second surfaces of the steel strip as the steel strip is moved above the coating bath;
    magnetically saturating the steel strip by flowing alternating currents through said at least first and second alternating current conducting paths, to induce an alternating current in said steel strip that has a phase that is opposite to a phase of the alternating currents flowing in said at least first and second alternating current carrying paths; and
    wherein a peak value of a magnetic pressure acting on the first and second surfaces of the steel strip is generated over areas of said first and second surfaces of said steel strip that are small relative to the surface area of each of said first and second surfaces of said steel strip by an interaction between the induced alternating current with the first and second alternating currents flowing in the alternating current conducting paths, whereby control of the coating weight on said hot-dipped steel strip is improved by providing said peak magnetic pressure on said areas of said first and second surfaces of said steel strip that are shall relative to said surface area of each of the surface areas of each of said first and second surfaces of said steel strip;
    wherein said step of positioning the at least first and second alternating current conducting paths comprises positioning said at least first and second alternating current conducting paths so that the first and second alternating current conducting paths define two points on a straight line that is perpendicular to the first and second surfaces of the steel strip; and
    wherein the respective currents flowing through the at least first and Second alternating current conducting paths have a common phase;
    placing a north pole and a south pole of at least one magnet such that the north pole and south pole of the at least one magnet face each other;
    positioning the steel strip between the north pole and south pole of the at least one magnet so that first and second edge portions of the steel strip are adjacent to the at least first and second alternating current conducting paths; and stabilizing the magnetic saturation of said steel strip provided by said magnetically saturating step with said at least one magnet.

3. The method of claim 2, further comprising:

positioning at least first and second pairs of alternating current conducting paths adjacent to the steel strip such that the first pair of alternating current conducting paths is positioned to be a greater distance from the steel strip than the second pair of alternating current conducting paths;

the first pair of alternating current conducting paths conducting a first alternating current signal therethrough;

the second pair of alternating current conducting paths conducting a second alternating current signal therethrough, said second alternating current signal being lower in a frequency thereof than said first alternating current signal;

providing at least two of said magnets;

positioning one of the at least two magnets adjacent to an upper portion of the first pair of alternating current conducting paths; and positioning another one of the at least two magnets adjacent to a lower portion of the second pair of alternating current conducting paths.

4. The method according to claim 2, further comprising:

positioning at least first and second pairs of alternating current conducting paths adjacent to the steel strip such that the first pair of alternating current conducting paths is positioned to be a greater distance from the steel strip than the second pair of alternating current conducting paths;

the first pair of alternating current conducting paths conducting a first alternating current signal therethrough;

the second pair of alternating current conducting paths conducting a second alternating current signal therethrough, the second alternating current signal being lower in a frequency thereof than said first alternating current signal; and positioning said at least one magnet between the first pair of alternating current conducting paths and the second pair of alternating current conducting paths.

5. The method of claim 2, wherein said at least one magnet comprises an electromagnet.

6. The method of claim 2, wherein said at least one magnet comprises a permanent magnet.

* * * * *

UNITED STATES PATENT AND TRADEMARK OFFICE
CERTIFICATE OF CORRECTION

PATENT NO. : 5,384,166
DATED : January 24, 1995
INVENTOR(S) : SATO et al

It is certified that error appears in the above-indentified patent and that said Letters Patent is hereby corrected as shown below:

Column 4, line 61, after "current", change "Conducting" to --conducting--;

Column 5, line 59, after "path", change "a$\alpha$" to --1a--;

Column 13, line 23, after "angle of", change "9020" to --90°-- and, line 65, after "repulsive", delete ",";

Column 16, line 49 (claim 2), after "that are", change "shall" to --small--.

Signed and Sealed this

Fifth Day of March, 1996

*Attest:*

*Attesting Officer*

BRUCE LEHMAN

*Commissioner of Patents and Trademarks*